(12) United States Patent
Gunsaullus

(10) Patent No.: US 8,925,683 B1
(45) Date of Patent: Jan. 6, 2015

(54) UTILITY HOLDING DEVICE

(76) Inventor: Scott E. Gunsaullus, Long Grove, IL (US)

( * ) Notice: Subject to any disclaimer, the term of this patent is extended or adjusted under 35 U.S.C. 154(b) by 46 days.

(21) Appl. No.: 13/506,587

(22) Filed: Apr. 30, 2012

(51) Int. Cl.
*B62B 3/04* (2006.01)

(52) U.S. Cl.
USPC ........................................ 182/129; 280/47.34

(58) Field of Classification Search
USPC .......... 182/129, 15, 17, 127, 62.5, 63.1, 69.4, 182/69.6, 101, 141, 151, 230, 12, 115, 120; 248/210; 206/373; 280/47.35, 47.34
See application file for complete search history.

(56) References Cited

U.S. PATENT DOCUMENTS

| | | | |
|---|---|---|---|
| 2,473,951 A | 6/1949 | Hickey | |
| 2,982,982 A | 5/1961 | Swift, Sr. | |
| 3,020,972 A * | 2/1962 | Hockett | 182/15 |
| 3,463,265 A * | 8/1969 | Clover | 182/17 |
| 3,642,240 A | 2/1972 | Hershey | |
| 3,741,510 A * | 6/1973 | Barnes | 248/229.1 |
| 3,857,460 A * | 12/1974 | Nini | 182/17 |
| 3,895,772 A | 7/1975 | Eillingson | |
| 4,085,818 A * | 4/1978 | Swager | 182/48 |
| 4,457,527 A | 3/1984 | Lowery | |
| 4,534,528 A | 8/1985 | Rousseau | |
| 4,730,802 A | 3/1988 | Chatham et al. | |
| 4,758,007 A * | 7/1988 | Reck | 280/33.992 |
| 4,869,344 A | 9/1989 | Peterson | |
| 5,333,823 A | 8/1994 | Joseph | |
| 5,507,363 A * | 4/1996 | Tredup | 182/129 |
| 5,547,080 A | 8/1996 | Klimas | |
| 5,613,574 A | 3/1997 | Melanson | |
| 5,673,885 A | 10/1997 | Pham | |
| 6,000,497 A | 12/1999 | Kain et al. | |
| 6,131,699 A | 10/2000 | Leak, Jr. | |
| 6,273,289 B1 | 8/2001 | Bowman | |
| 6,688,570 B1 | 2/2004 | Mundt | |
| 6,892,858 B1 | 5/2005 | Zupan | |
| 6,896,273 B2 * | 5/2005 | Forsberg et al. | 280/79.11 |
| 6,955,384 B1 * | 10/2005 | Good | 296/3 |
| 7,188,843 B2 * | 3/2007 | Magness | 280/30 |
| 7,240,910 B2 | 7/2007 | Stuemke | |
| 7,337,901 B2 | 3/2008 | Phillips | |
| 7,581,915 B1 * | 9/2009 | Bristol | 414/11 |
| 7,753,169 B1 * | 7/2010 | Kurtz | 182/17 |
| 8,590,921 B2 * | 11/2013 | Benson et al. | 280/656 |
| 2001/0045718 A1 * | 11/2001 | Boirum | 280/47.26 |
| 2003/0178253 A1 * | 9/2003 | Tatge et al. | 182/132 |
| 2003/0218308 A1 * | 11/2003 | Lamson | 280/79.3 |
| 2004/0055979 A1 | 3/2004 | Fabregas | |
| 2004/0227315 A1 * | 11/2004 | Van Landingham, Jr. | 280/47.35 |
| 2005/0056486 A1 | 3/2005 | Butler et al. | |
| 2005/0284697 A1 * | 12/2005 | Perelli et al. | 182/20 |
| 2006/0192063 A1 | 8/2006 | Angotti | |
| 2007/0074933 A1 * | 4/2007 | Kerns | 182/127 |
| 2007/0182114 A1 * | 8/2007 | Fernandes et al. | 280/47.35 |
| 2007/0262567 A1 * | 11/2007 | Benson et al. | 280/656 |
| 2007/0292247 A1 * | 12/2007 | Wilson | 414/331.06 |
| 2010/0155177 A1 | 6/2010 | Tydings, III | |
| 2011/0226554 A1 * | 9/2011 | Anderson | 182/222 |

\* cited by examiner

*Primary Examiner* — Katherine Mitchell
*Assistant Examiner* — Daniel Cahn
(74) *Attorney, Agent, or Firm* — Mathew R. P. Perrone, Jr.

(57) ABSTRACT

A utility holding device is suitable for carrying tools and materials at a construction site. The utility holding device is especially useful for carrying tools and materials for an electrician or a plumber. The wheels provide mobility. The ladder attachment permits a utility holding device to be safely used with a ladder. The scaffold attachment permits a utility holding device to be safely used with a scaffold.

5 Claims, 41 Drawing Sheets

UTILITY HOLDING DEVICE

This invention relates to a utility holding device and more particularly to a utility holding device, which greatly simplifies transport of tools and materials to a work area and additionally is very suitable for use by an electrician or a plumber.

BACKGROUND OF THE INVENTION

Work on any building is inherently dangerous for any worker. For an electrician or plumber, there is a wide variety of tools and materials that the electrician or plumber must move to a work area before the electrician or plumber can start, do or complete the desired work. To simplify such movement, it is very desirable to have a carrying or holding device, or other apparatus capable of carrying such tools and materials to a desired work area.

Due to the wide variety of tools and materials required for an electrician or plumber to use, it is difficult to design an appropriate device to accomplish this goal. With the change in materials and design tools, a device, which works for one set of material or tools, may not work for other sets of tools and materials. Thus, it becomes quite difficult to design an appropriate cart for an electrician or a plumber to use. If the cart is large enough to carry a substantial number of tools and materials, it is too bulky to use around the construction site. If it is small enough to be easily moved around a construction site, the cart may not be able to handle all of the desired tools and materials for a particular project.

Adjustability is another desired feature for such a utility holding device. For example, if the height of the device can be easily changed, the device becomes more flexible and able to fit into more places. Absent this adjustability, the value of the utility holding device is greatly decreased.

It is also useful if the utility holding device can be used with a ladder. In this way, the worker can use a ladder while having material and tools conveniently available. Such convenience provides for both safety and efficiency for the worker, as well as the project itself.

Yet such a cart is a very desirable device. Not only is the work with such a utility holding device made more efficient, safety on the job and for the worker can be increased. This clearly means safety for both the workers and for the observers. Worker safety is improved by reducing material trips up and down the ladder, as well as for other reasons. Observer safety is obtained when less material leaves the work surface as well as for other reasons.

If this cart can cooperate with other implements at the construction site, even more advantages are obtained. For example, if this cart can be used with a ladder, whether the ladder includes a tray or not, great advantages are obtained. If the utility holding device can be used with a scaffold or a lift, further advantages are obtained.

Many times, an electrician or plumber is required to use a ladder. If the cart for transporting tools and materials cooperates with the ladder, great advantages are obtained. Not only does the worker become more efficient, safety is promoted. Therefore, a cart, especially a cart suitable for use by an electrician or a plumber, provides many desired results.

So improvements in ladder safety and worker safety can positively enhance working conditions for the workers, and others in and around the construction area. It is very desirable to create a device to accomplish these goals.

SUMMARY OF THE INVENTION

Among the many objectives of the present invention is the provision of a utility holding device suitable for carrying tools and materials at a construction site.

Another objective of the present invention is the provision of a utility holding device suitable for carrying tools and materials for an electrician or a plumber.

Yet another objective of the present invention is the provision of a utility holding device suitable for carrying tools and materials for an electrician or a plumber, which has adjustable carrying features.

Still, another objective of the present invention is the provision of a utility holding device suitable for carrying tools and materials for an electrician or a plumber, which is adjustable with regard to height.

Also, an objective of the present invention is the provision of a utility holding device suitable for carrying tools and materials at a construction site, which improves worker efficiency.

A further objective of the present invention is the provision of a utility holding device suitable for carrying tools and materials at a construction site, which improves worker safety.

A still further objective of the present invention is the provision of a utility holding device suitable for cooperating with a ladder.

Yet a further objective of the present invention is the provision of a utility holding device suitable for cooperating with a scaffold or lift.

These and other objectives of the invention (which other objectives become clear by consideration of the specification, claims and drawings as a whole) are met by providing a utility holding device suitable for carrying tools and materials at a construction site. The utility holding device is especially useful for carrying tools and materials for an electrician or a plumber. The wheels provide mobility. The ladder attachment permits a utility holding device to be safely used with a ladder. The scaffold attachment permits a utility holding device to be safely used with a scaffold.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
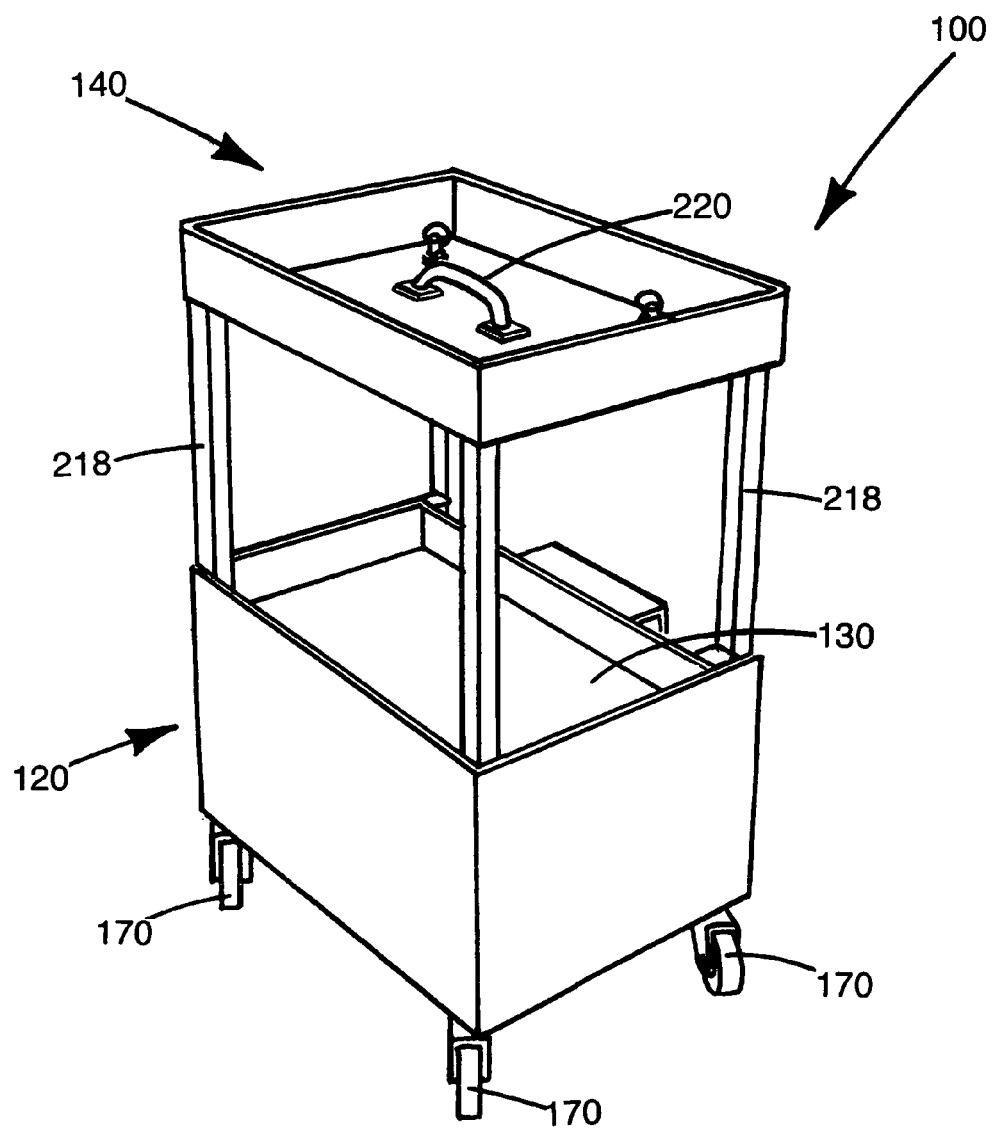
FIG. 1 depicts a front perspective view of the utility holding device 100 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

The utility holding device of this invention provides many great advantages, especially in the construction and plumbing industries. An especially successful version of this utility holding device is as a cart for an electrician or plumber to transport the required tools and materials around the construction site. The utility holding device has a base supporting a main storage area and a top segment. Telescoping or fixed arms connect the base to the top segment. A handle facilitates moving the top segment relative to the base. Observer safety is obtained when less material leaves the work surface of the top segment, because of the high work tray edges. The top segment is either a top compartment tray or an aperture tray.

The base is generally rectangular with a caster, preferably a lockable caster, mounted at each corner thereof. Thus, the utility holding device can be moved on the casters, with the casters being locked or unlocked as desired. Also, this utility holding device may be releasably secured to a desired surface. This surface may be ladder, a scaffold, or other suitable surface.

Figure 2:
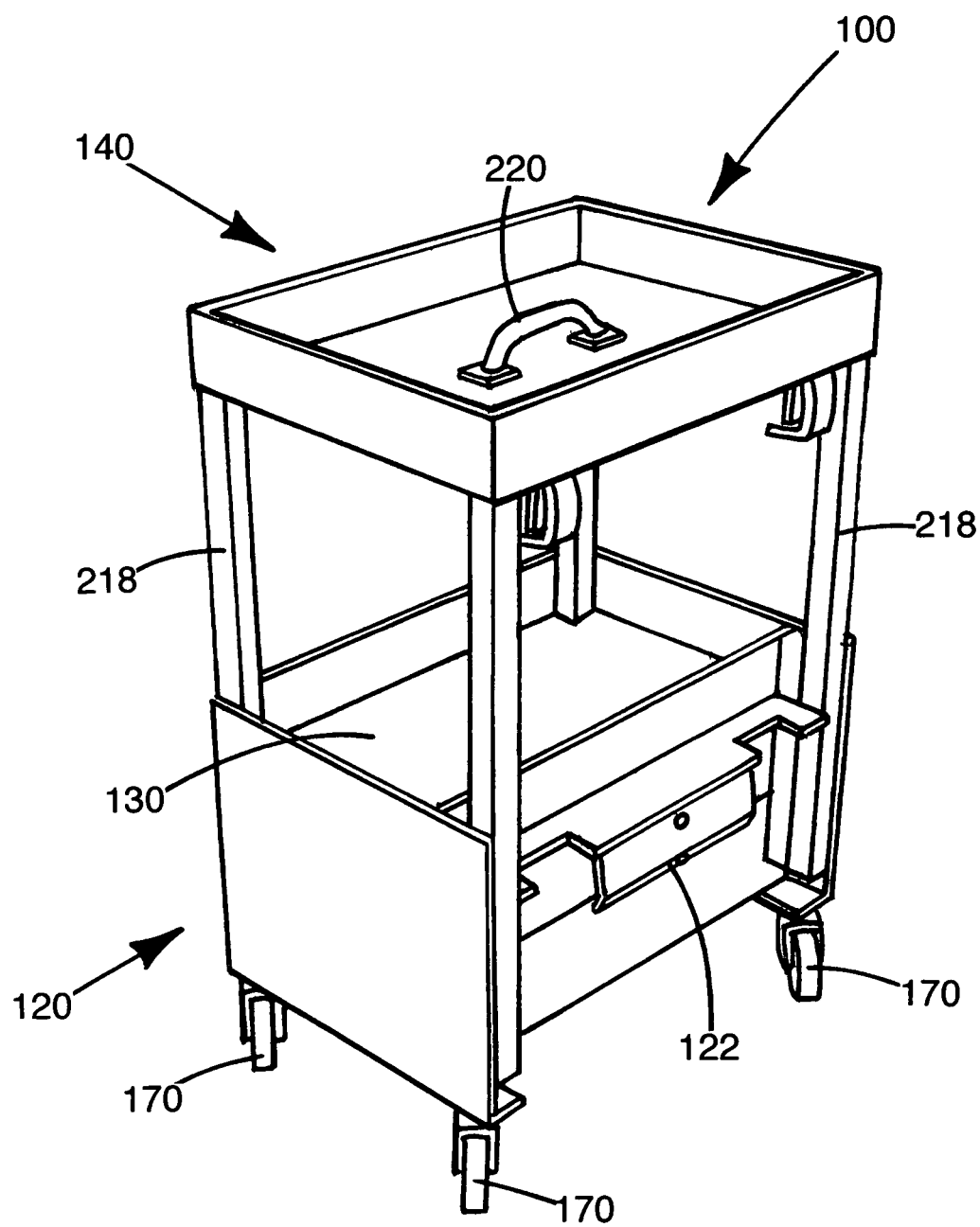
FIG. 2 depicts a rear perspective view of the utility holding device 100 of this invention, as a reverse view of FIG. 1.

Referring now to FIG. 1 and FIG. 2, the utility holding device 100 has base 120 with top compartment tray 140 mounted thereon, with fixed risers 218. Top compartment tray 140 is the top segment in this embodiment. Thus, fixed risers 218 connect base 120 to top compartment tray 140. Lockable casters 170 support base 120 and are oppositely disposed from the top compartment tray 140. Lockable casters 170 allow the utility holding device 100 to be easily transported around the work area but securely positioned once a desired destination is reached. Operation of the top compartment tray 140 is supported by main storage area 130 and base 120.

Figure 22:
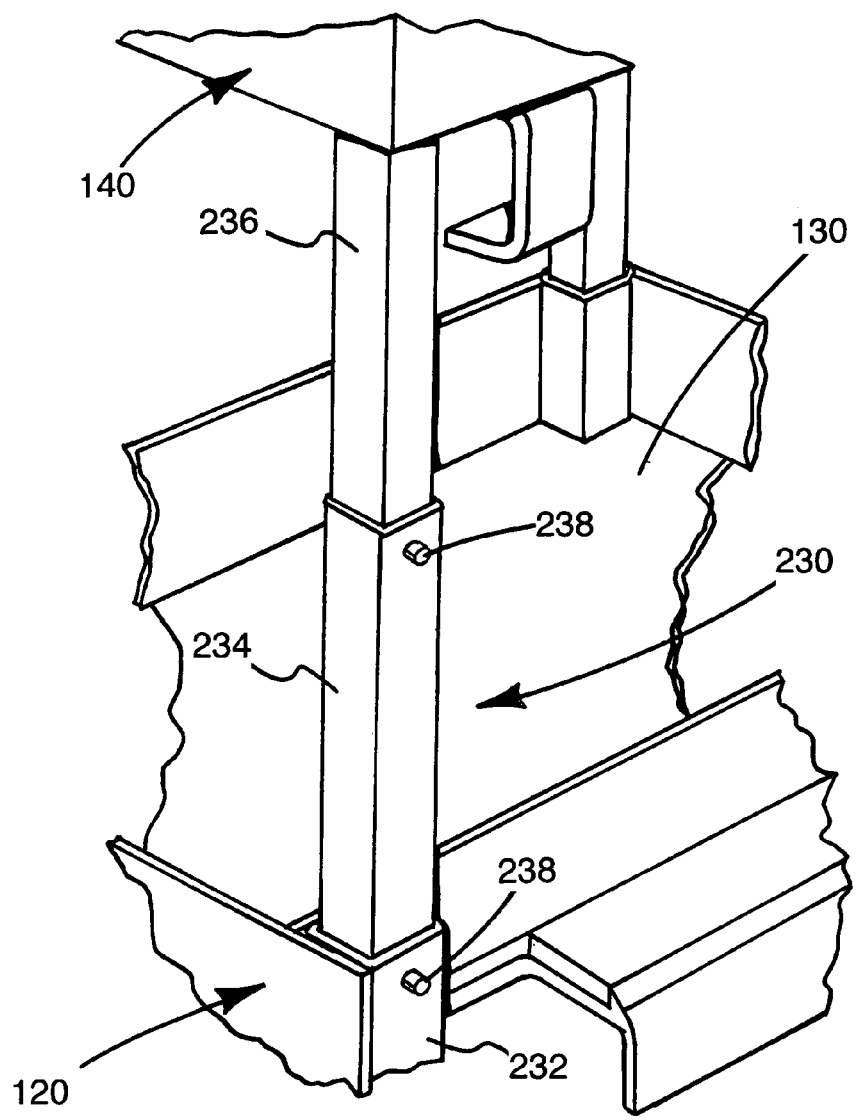
FIG. 22 depicts the utility holding device 100 of this invention with the telescopic assemblies 230 in raised position 228.
Figure 23:
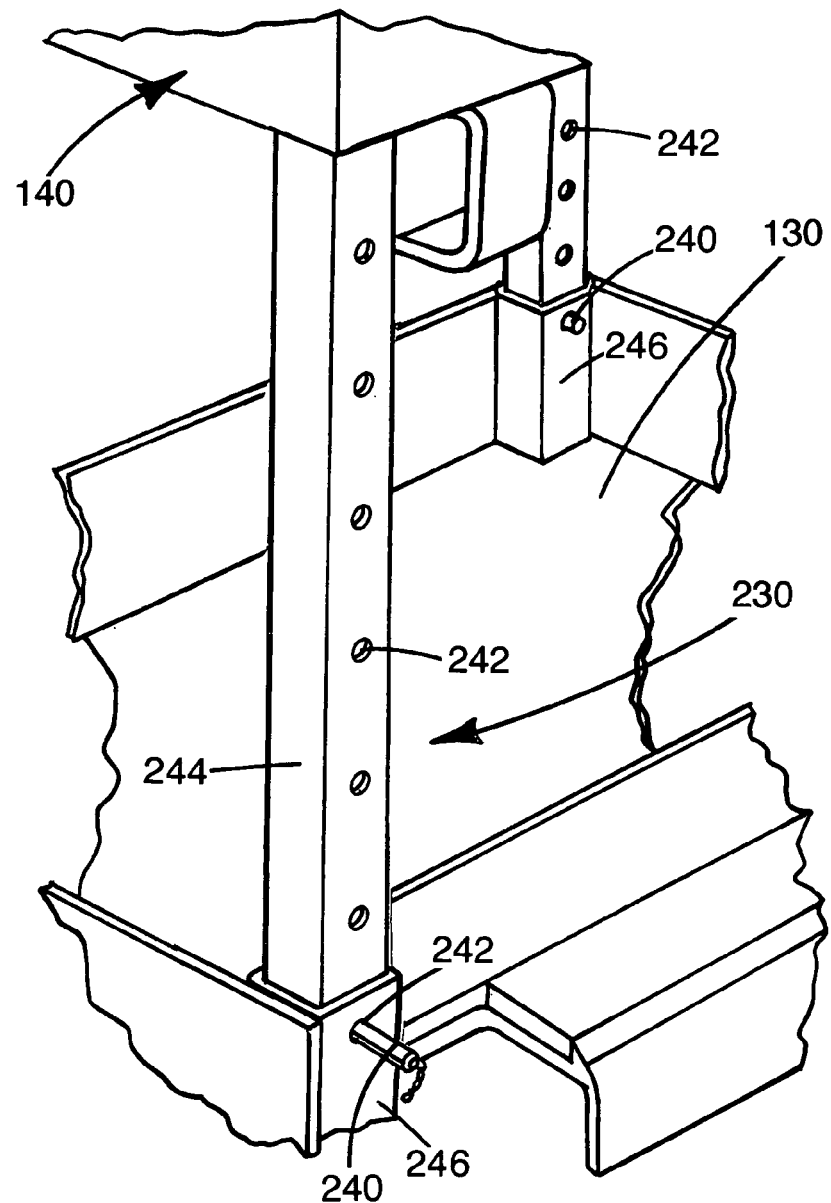
FIG. 23 depicts the utility holding device 100 of this invention with the flexible length risers 244 in raised position 228.
Figure 24:
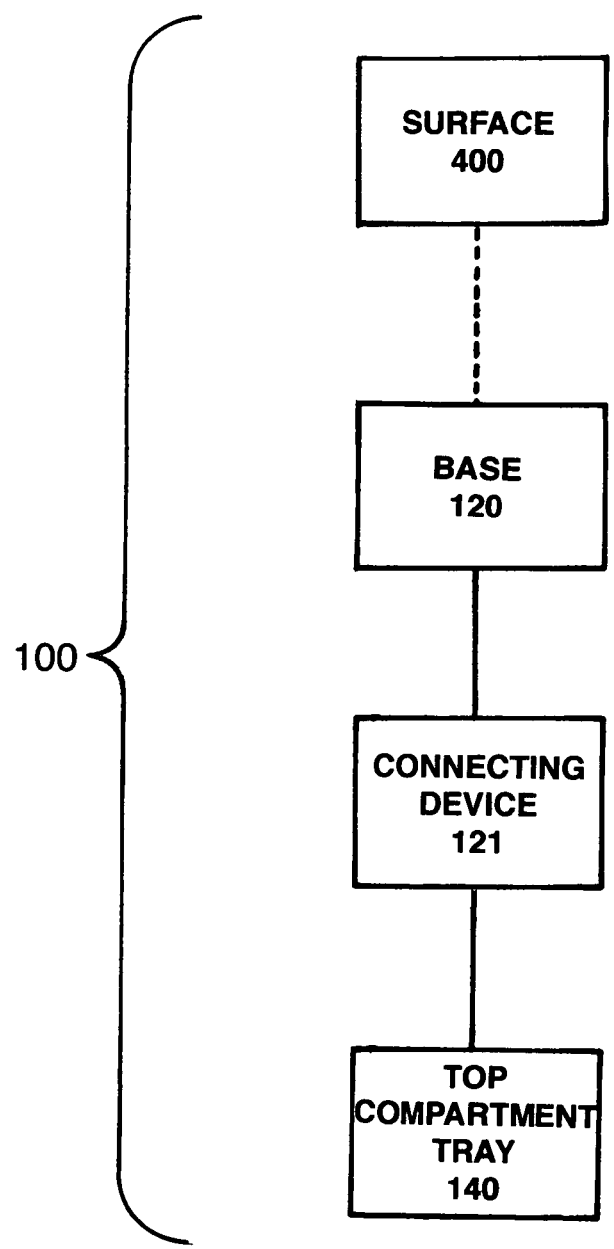
FIG. 24 depicts a block diagram of utility holding device 100 of this invention.

While fixed risers 218 are depicted in FIG. 1 and FIG. 2, the telescopic assemblies 230 of FIG. 22, FIG. 23, and FIG. 24 may also be used to connect top compartment tray 140 to base 120. Handle 220 is centrally located in and facilitates moving top compartment tray 140 to different heights above main storage area 130 along the telescopic assemblies 230. Such adjustments make utility holding device 100 extremely useful.

Figure 3:
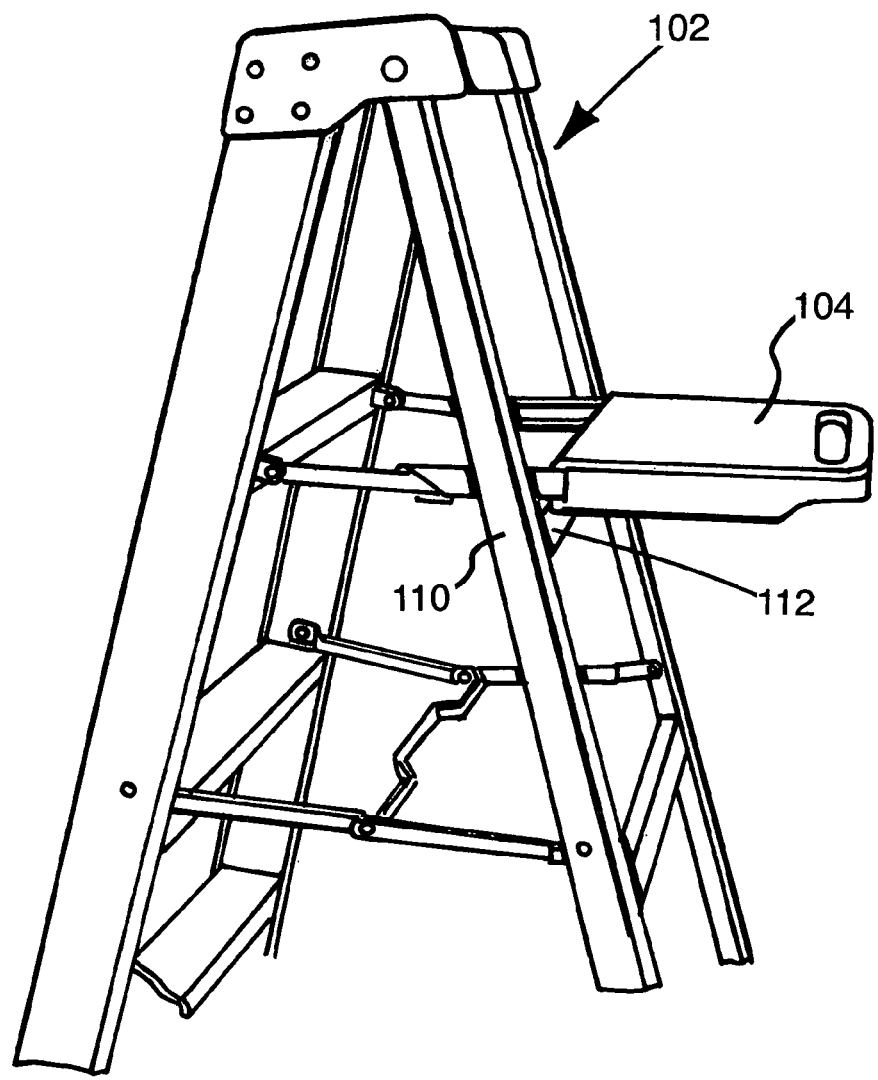
FIG. 3 depicts a side perspective view of a metal ladder 102 suitable for use with the utility holding device 100 of this invention.
Figure 4:
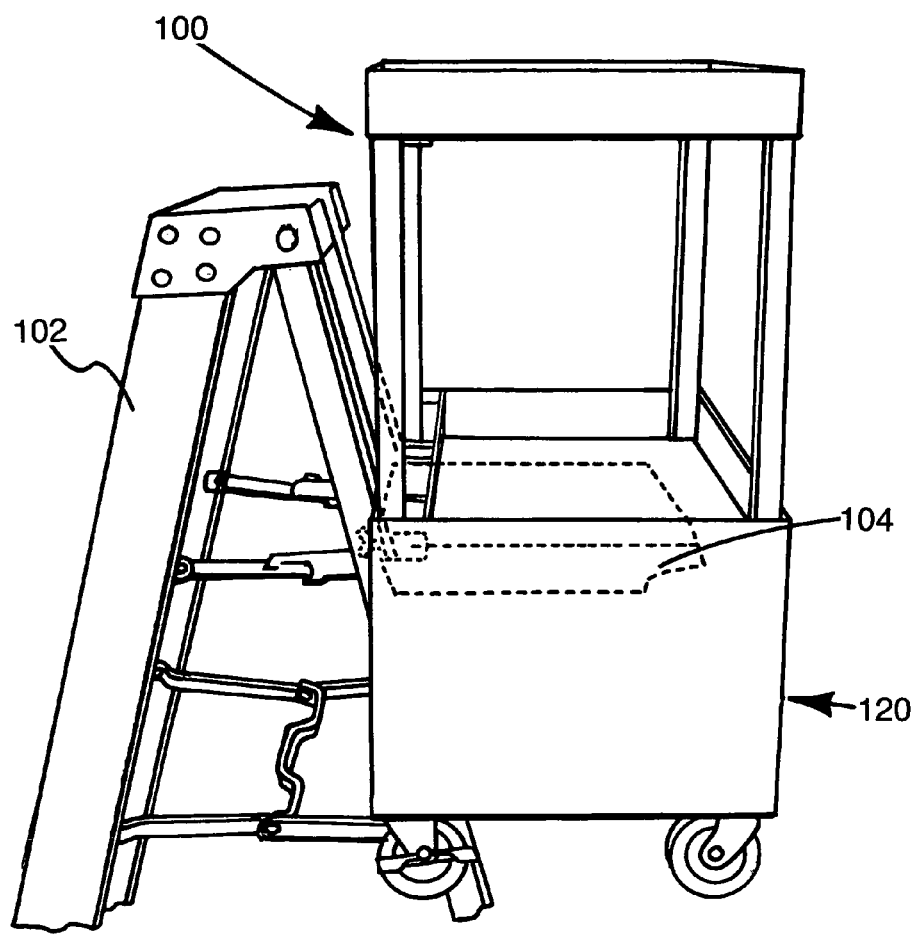
FIG. 4 depicts a side perspective view of a metal ladder 102 with the utility holding device 100 mounted thereon.
Figure 5:
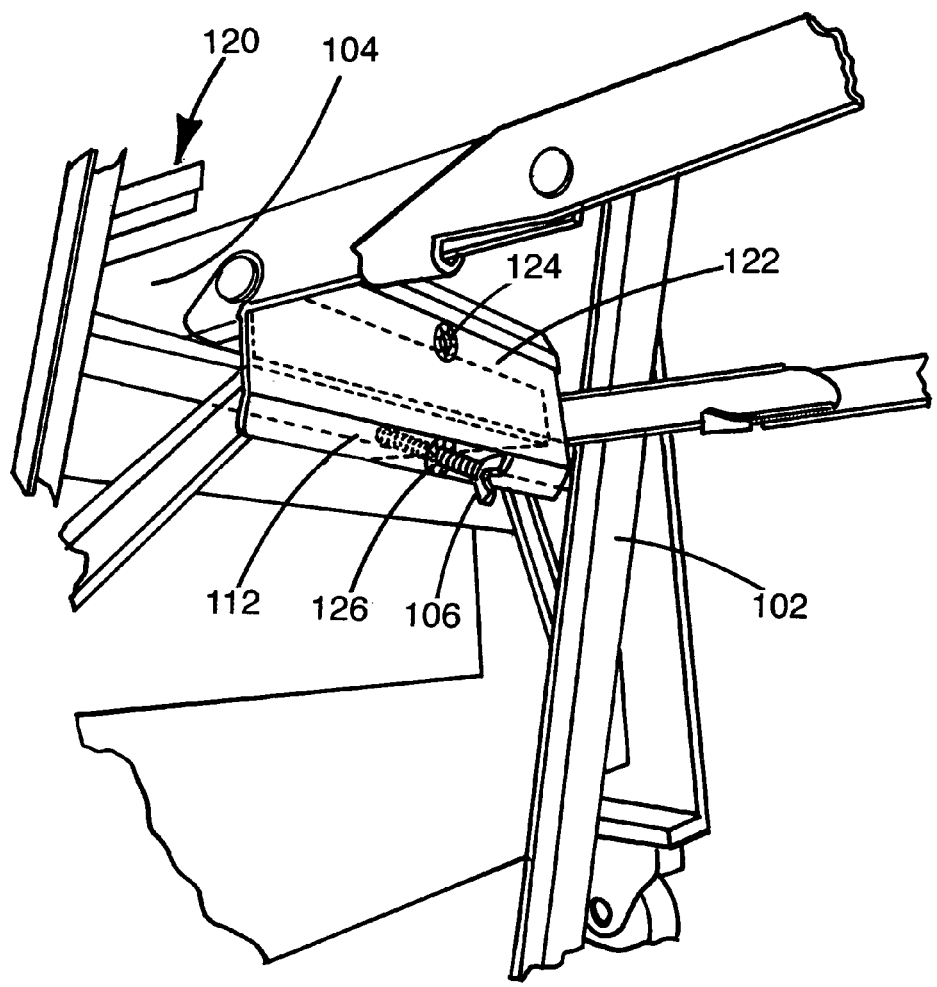
FIG. 5 depicts a perspective view of a metal ladder 102 with the utility holding device 100 sitting on ladder tray 104 and being held in place by ladder anchor plate 122.

Adding FIG. 3, FIG. 4, and FIG. 5 to the consideration, the structure of utility holding device 100 and its utility relative to metal ladder 102 becomes clearer. Metal ladder 102 includes ladder tray 104, which supports utility holding device 100 thereon. More specifically, base 120 of utility holding device 100 has an attachment means, which in the preferred embodiment is a ladder anchor plate 122. Ladder anchor plate 122 has an upper threaded aperture 124 and a lower threaded aperture 126. Ladder anchor plate 122 extends from base 120 and includes lower threaded aperture 126 to receive anchor bolt 106 in threaded relation therewith. Lower threaded aperture 126 allows for proper alignment between anchor bolt 106 and cross member 112 due to the position of ladder tray 104 on metal ladder 102. Ladder anchor plate 122 reaches above, behind, and under cross member 112 to secure the utility holding device 100 to metal ladder 102. Anchor bolt 106 may be placed into contact with cross member 112 to provide additional support between the utility holding device 100 and metal ladder 102. Utility holding device 100 does not need to contact the vertical members of metal ladder 102 for additional support.

Figure 6:
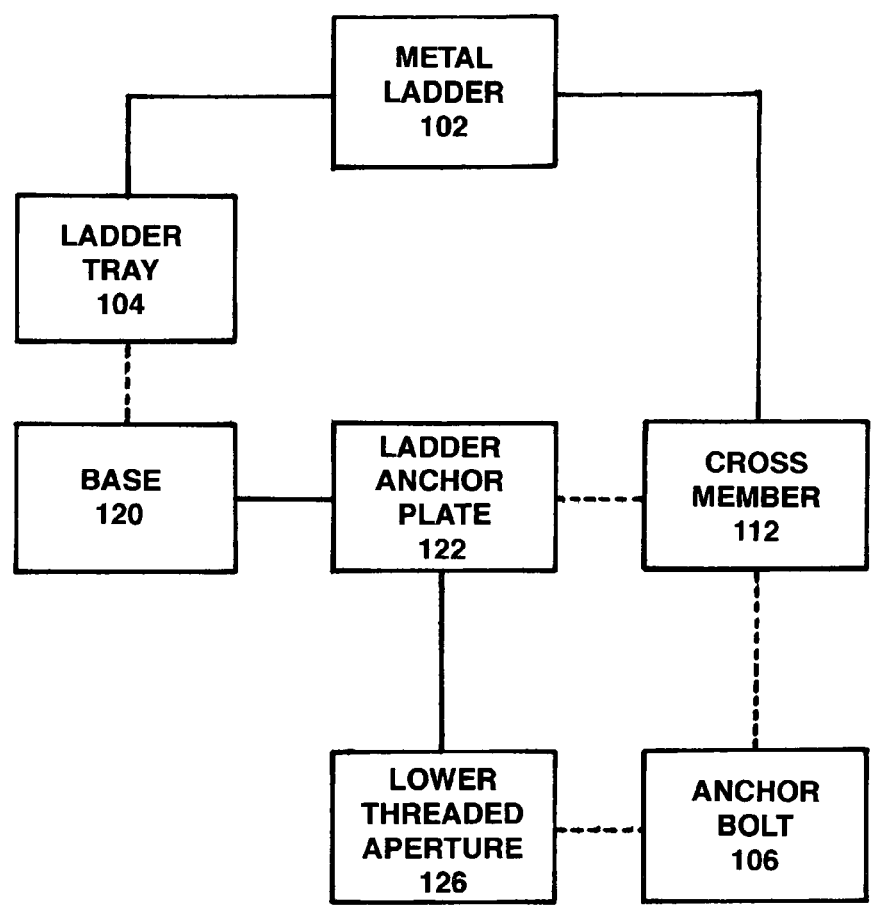
FIG. 6 depicts a metal ladder 102 the utility holding device 100 attached thereto, as a box chart.

Turning now to FIG. 6, metal ladder 102 includes ladder tray 104. To ladder tray 104, base 120 of utility holding device 100 (FIG. 1) is attached. Base 120 includes a ladder anchor plate 122. Base 120 rests on ladder tray 104. Ladder anchor plate 122 includes a lower threaded aperture 126. Through lower threaded aperture 126, anchor bolt 106 may be placed in a threaded relationship therewith and into contact with cross member 112 of the metal ladder 102. This procedure secures base 120 to cross member 112 and ultimately the utility holding device 100 to metal ladder 102.

Figure 7:
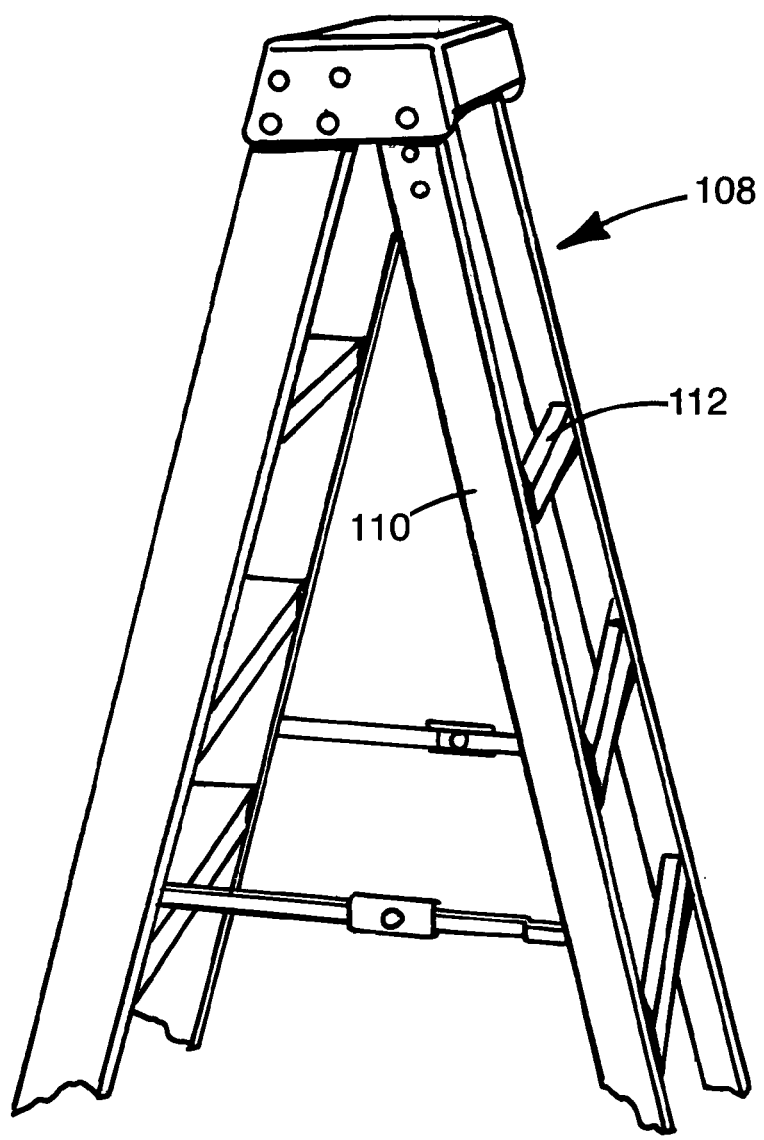
FIG. 7 depicts a side, perspective view of a non-metallic ladder 108 suitable for use with the utility holding device 100 of this invention.
Figure 8:
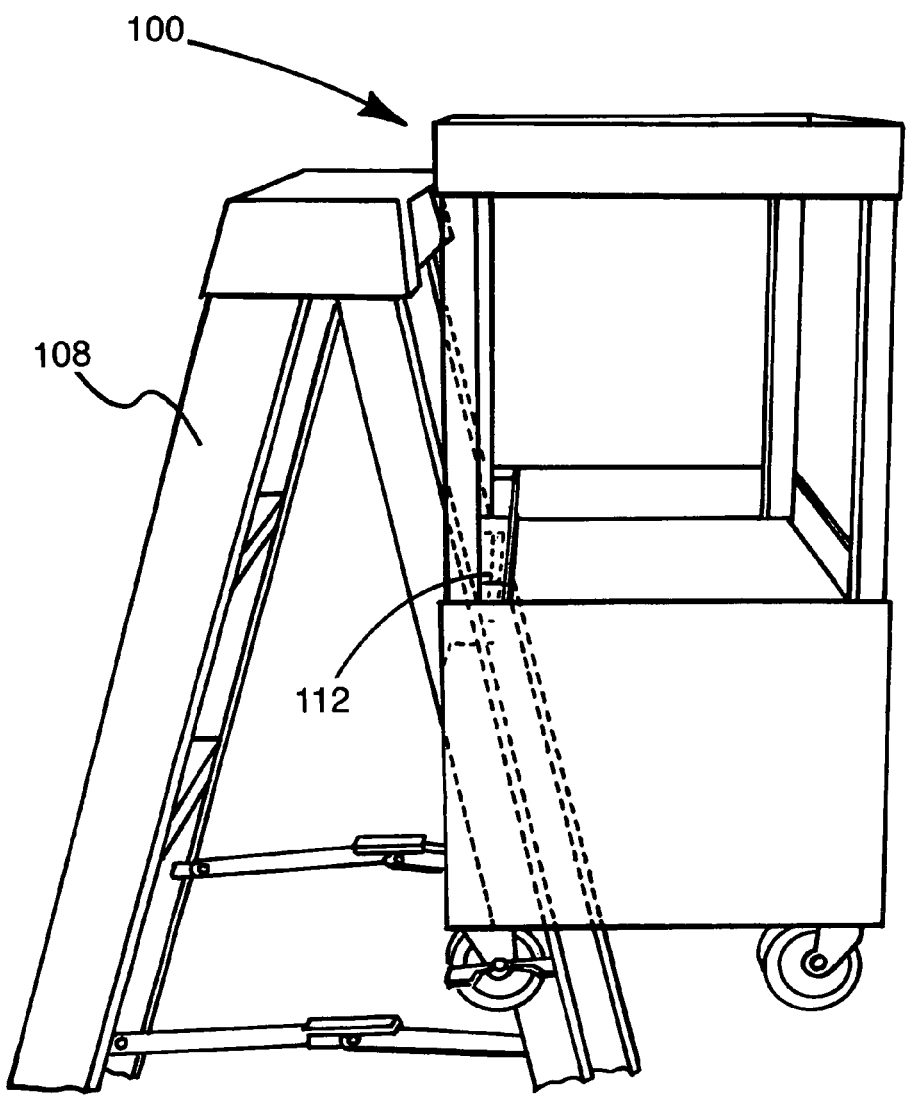
FIG. 8 depicts a side, perspective view of a non-metallic ladder 108 with the utility holding device 100 mounted thereon.
Figure 9:
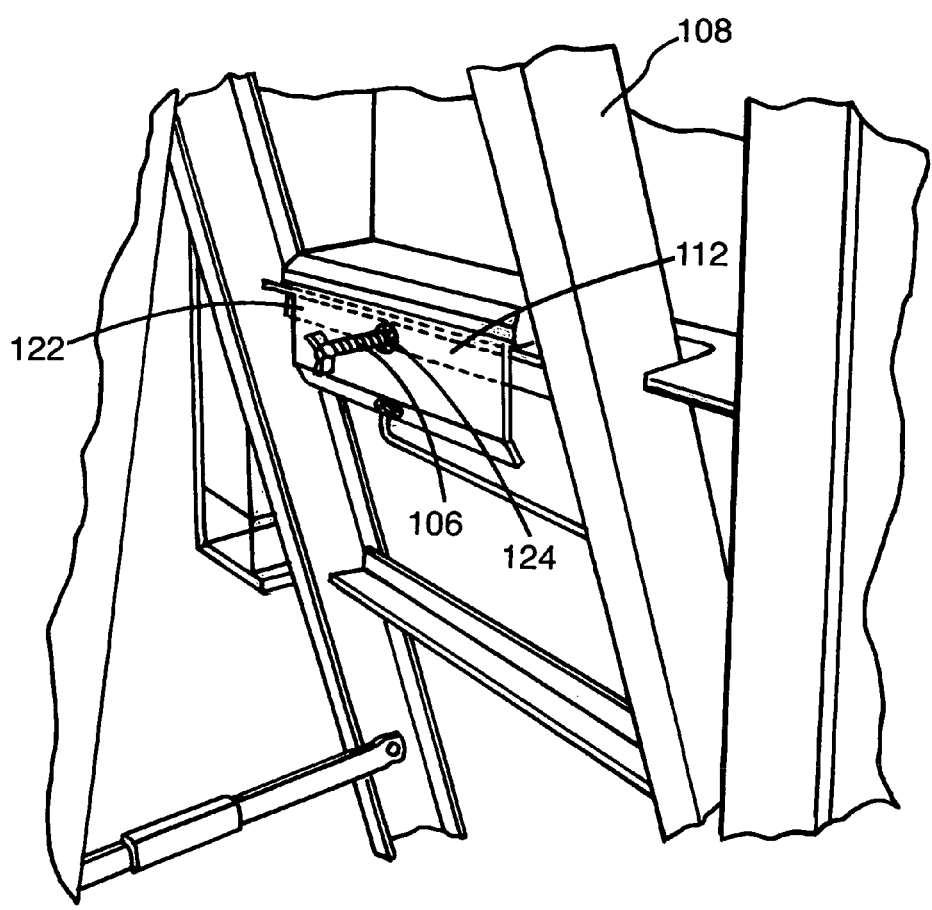
FIG. 9 depicts a perspective view of a non-metallic ladder 108 with the utility holding device 100 being held in place by ladder anchor plate 122.

Now adding FIG. 7, FIG. 8, and FIG. 9 to the consideration, the securing of utility holding device 100 to non-metallic ladder 108 is depicted. Ladder anchor plate 122 of utility holding device 100 fits over cross member 112 of non-metallic ladder 108. Then anchor bolt 106 can be placed in a threaded relationship with upper threaded aperture 124. Utility holding device 100 rests against and is further supported by the two vertical members 110 of non-metallic ladder 108. In this fashion, utility holding device 100 is secured to non-metallic ladder 108.

Figure 10:
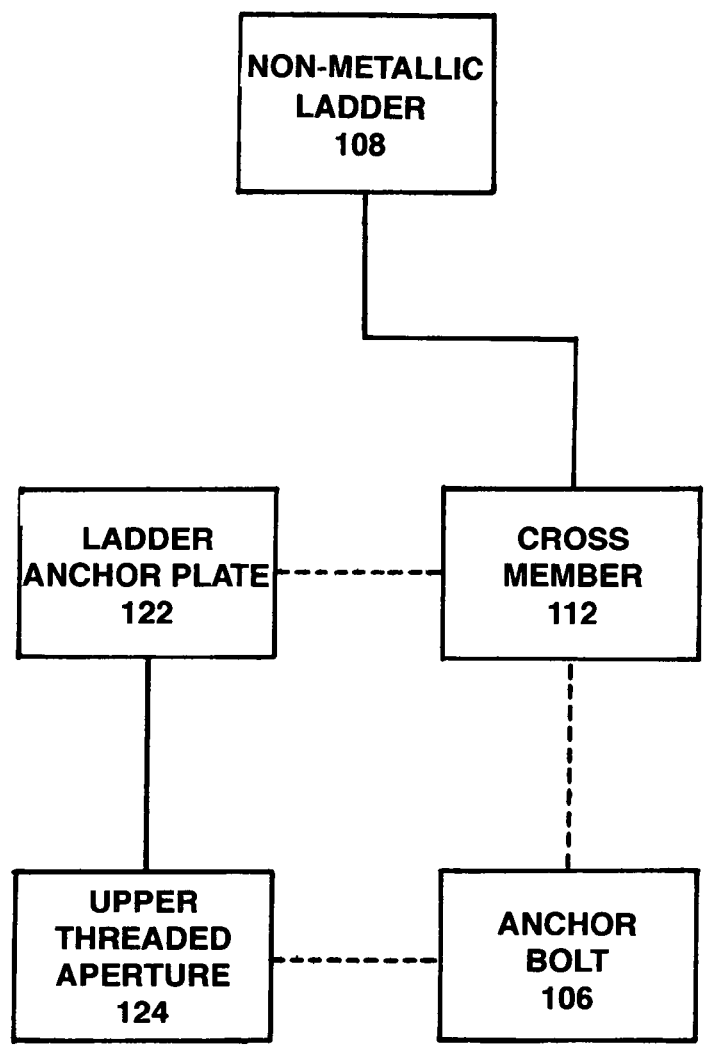
FIG. 10 depicts a non-metallic ladder 108 with the utility holding device 100 attached thereto, as a box chart.
Figure 11:
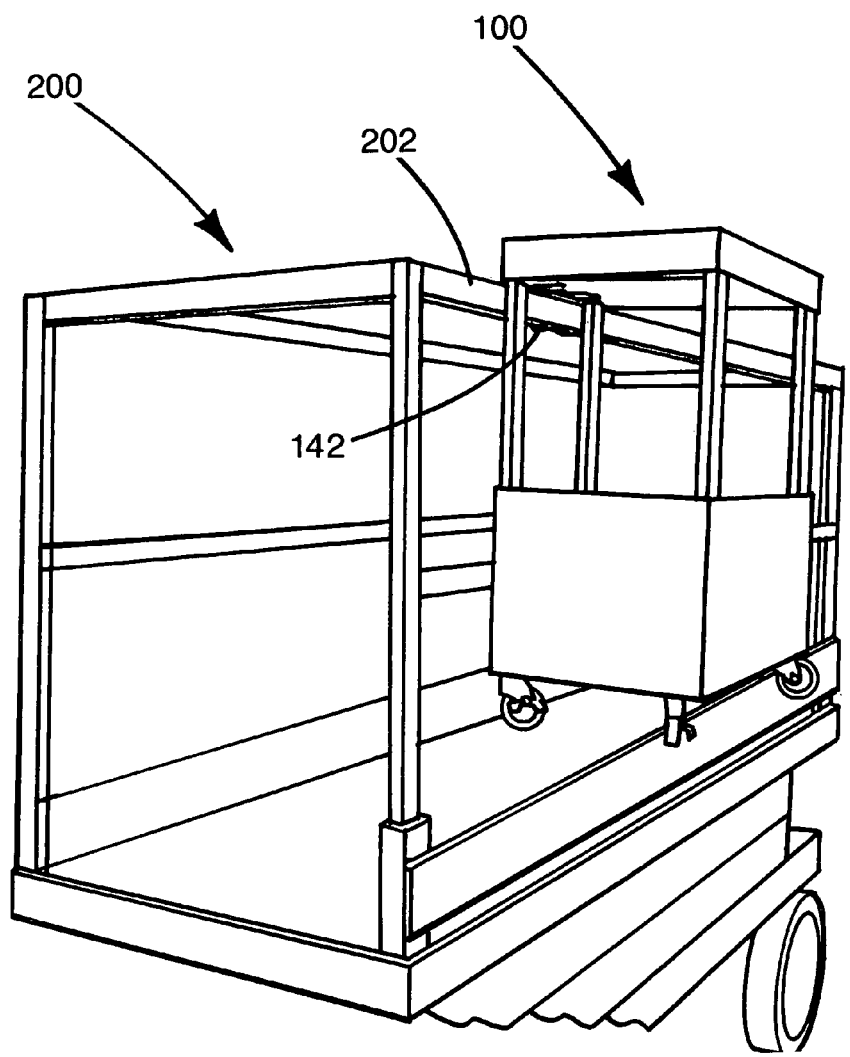
FIG. 11 depicts a side, perspective view of the utility holding device 100 of this invention mounted on a lift scaffold 200.

With the addition of FIG. 10, attaching and securing the utility holding device 100 (FIG. 7) to the non-metallic ladder 108 is accomplished through the ladder anchor plate 122 and the upper threaded aperture 124. Ladder anchor plate 122 attaches on above, behind, and under cross member 112. The anchor bolt 106 contacts the cross member 112 through the upper threaded aperture 124. Due to the position utility tray 100 takes on non-metallic ladder 108, upper threaded aperture 124 must be used so that anchor bolt 106 is able to contact cross member 112 and provide a secure connection.

When use of utility holding device 100 is considered with the power scaffold 200, one must consider FIG. 11, FIG. 12, FIG. 13, FIG. 14, FIG. 15, FIG. 16, FIG. 17, FIG. 18, and FIG. 19. It is possible to use adjustable anchor clamps 142 of top compartment tray 140 to support the utility holding device 100 on the power scaffold 200. More specifically, railing 202 of scaffold 200 and receives the adjustable anchor clamps 142.

To adjust the anchor clamps 142, a spring loaded latch pin 208 is used. The spring loaded latch pin 208 fits into latch pin washer 216 and then through female threaded aperture 128 in top compartment tray 140. Deployed aperture 210 or closed aperture 212 on adjustable anchor clamp 142 may align with the female threaded aperture 128. Rear clamp guide cradle 136 is situated below the top compartment tray 140 and has a cradle aperture 138 alignable with female threaded aperture 128 and deployed aperture 210 or closed aperture 212.

Figure 17:
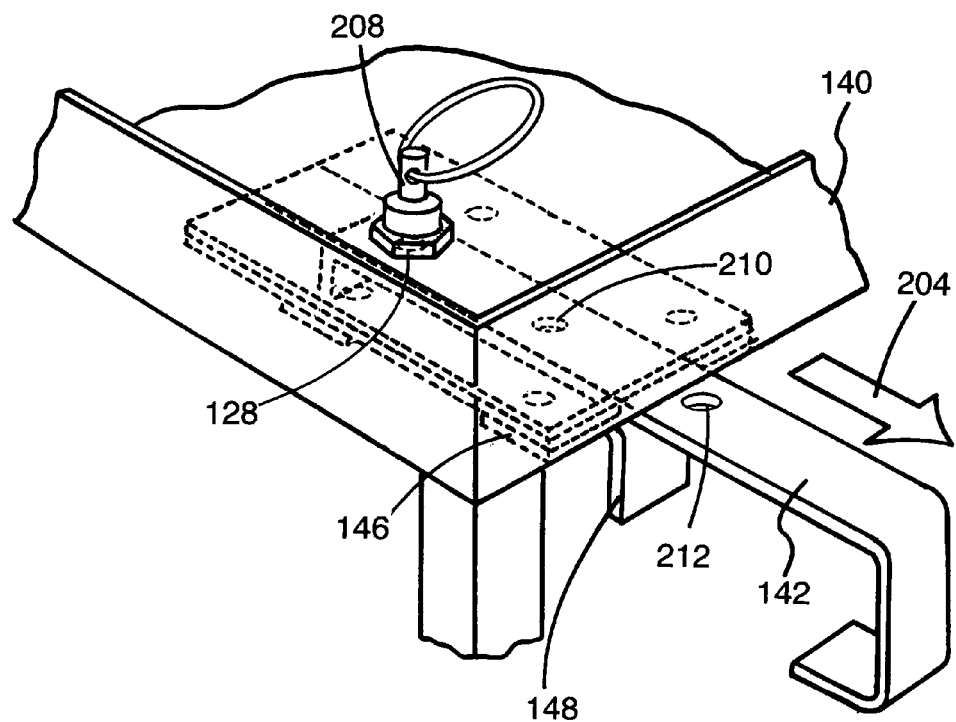
FIG. 17 depicts a perspective top view of an adjustable anchor clamp 142 in fully extended position 204.
Figure 18:
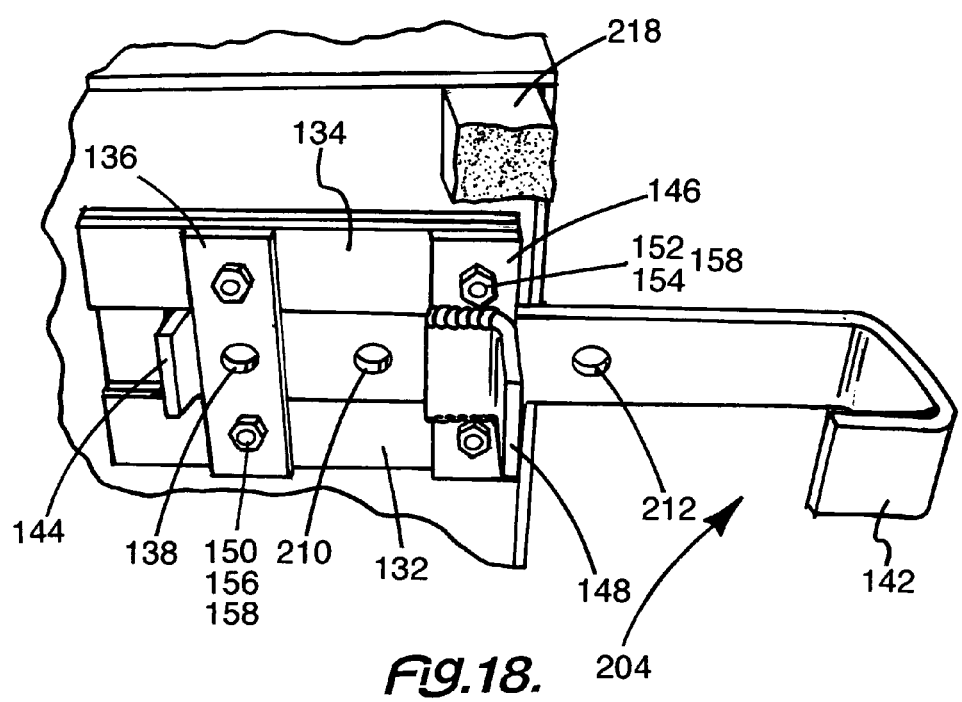
FIG. 18 depicts a perspective, bottom view of an adjustable anchor clamp 142 in fully extended position 204.
Figure 19:
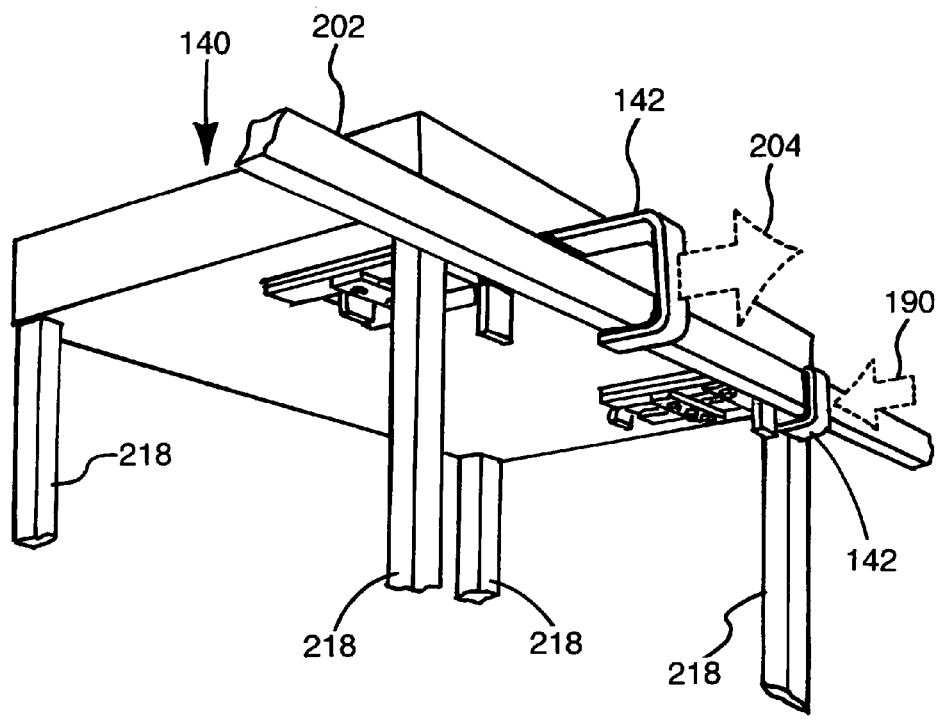
FIG. 19 depicts a bottom, perspective view of for two of the adjustable anchor clamp 142 with one in secured railing position 190 and the other in fully extended position 204.

Each adjustable anchor clamp 142 has a fully extended position 204, a closed position 206, and a secured railing position 190. Fully extended position 204 requires no special aperture on adjustable anchor clamp 142 (FIG. 17, FIG. 18, and FIG. 19). Spring loaded latch pin 206 inserts into female threaded aperture 128 on top compartment tray 140. Fully extended position 204 allows the railing to be inserted or removed. Deployed aperture 210 and closed aperture 212 are positioned on adjustable anchor clamp 142 in order to provide for positioning thereof as desired.

Figure 12:
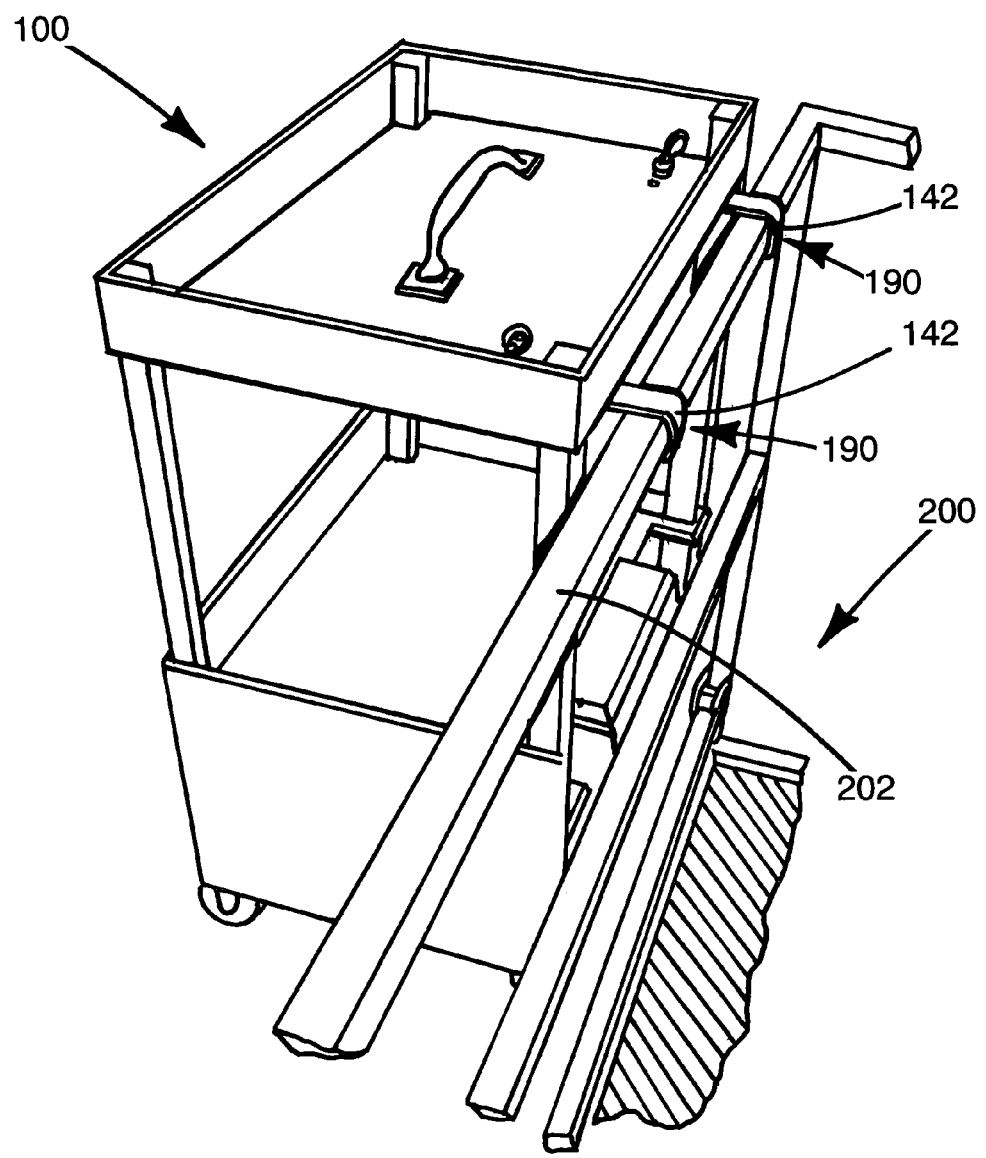
FIG. 12 depicts a rear, perspective view of the utility holding device 100 of this invention mounted on a lift scaffold 200.
Figure 13:
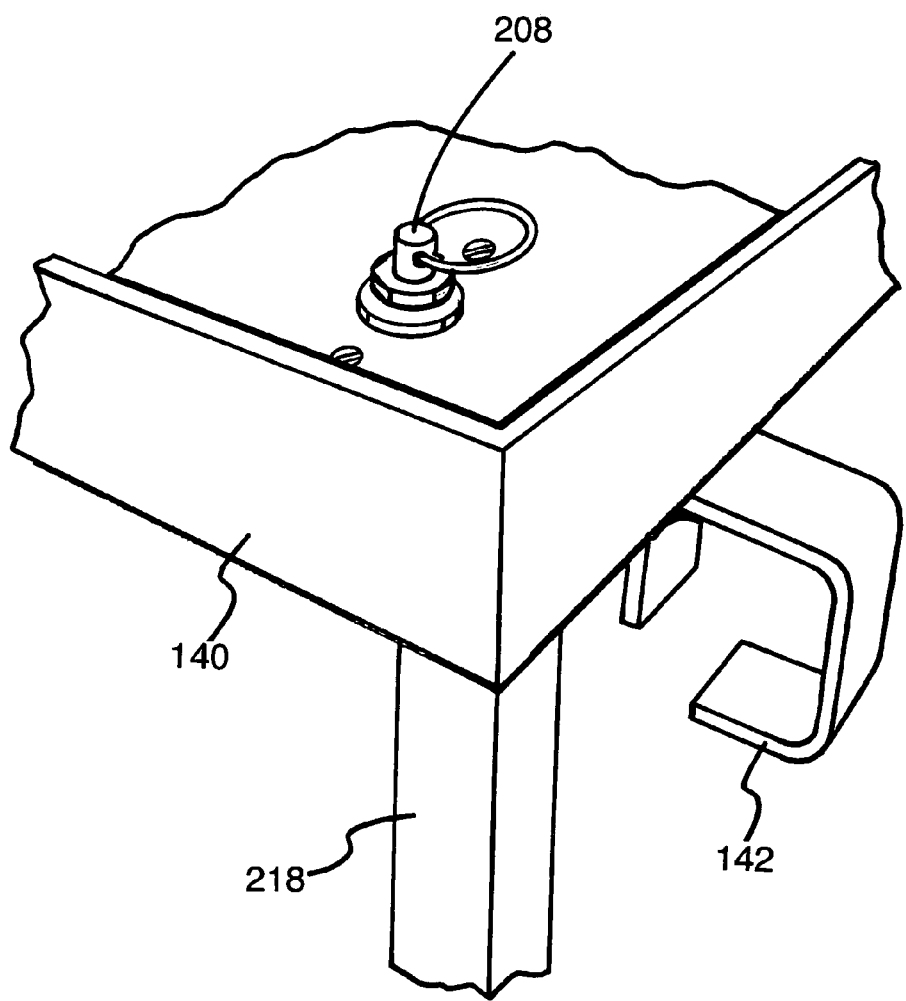
FIG. 13 depicts a perspective corner view of a top compartment tray 140 for the utility holding device 100 of this invention.
Figure 14:
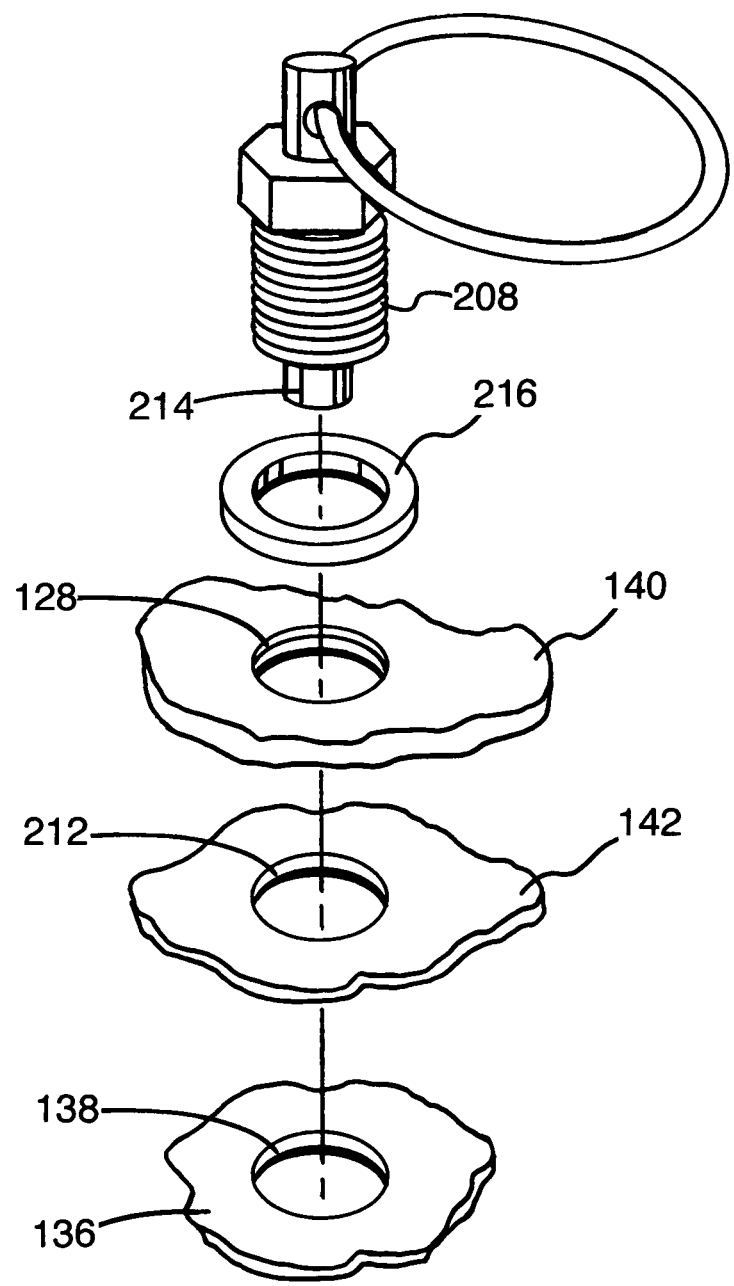
FIG. 14 depicts an exploded perspective view of the alignment of apertures for the utility holding device 100.
Figure 15:
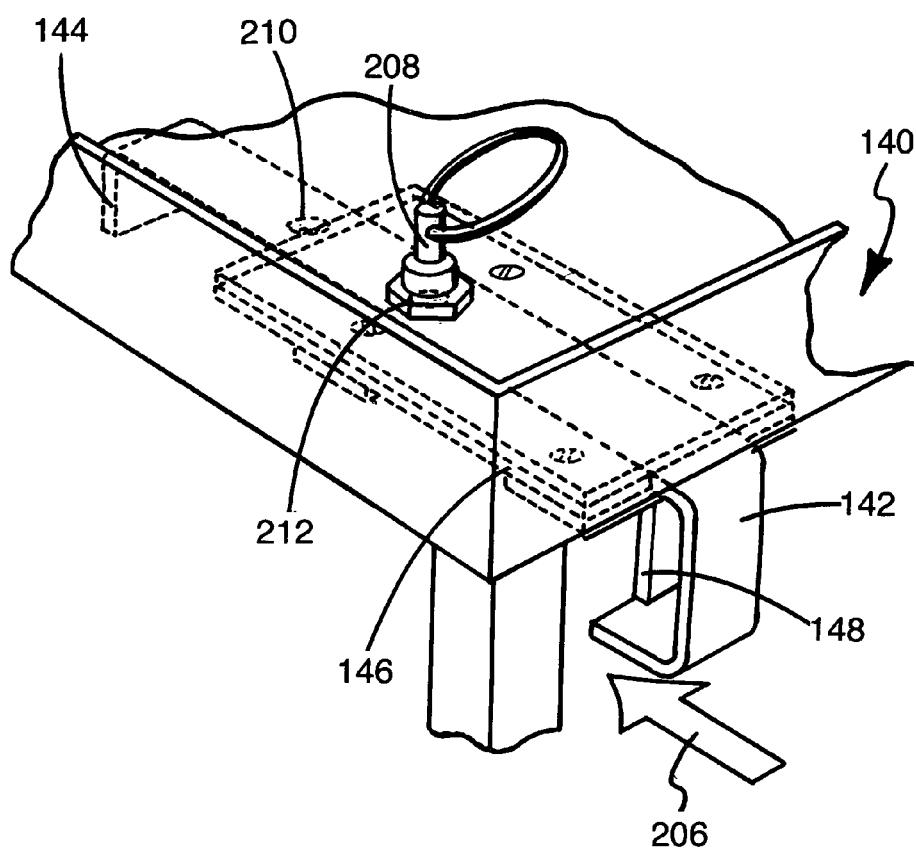
FIG. 15 depicts a perspective view of an adjustable anchor clamp 142 in closed position 206.
Figure 16:
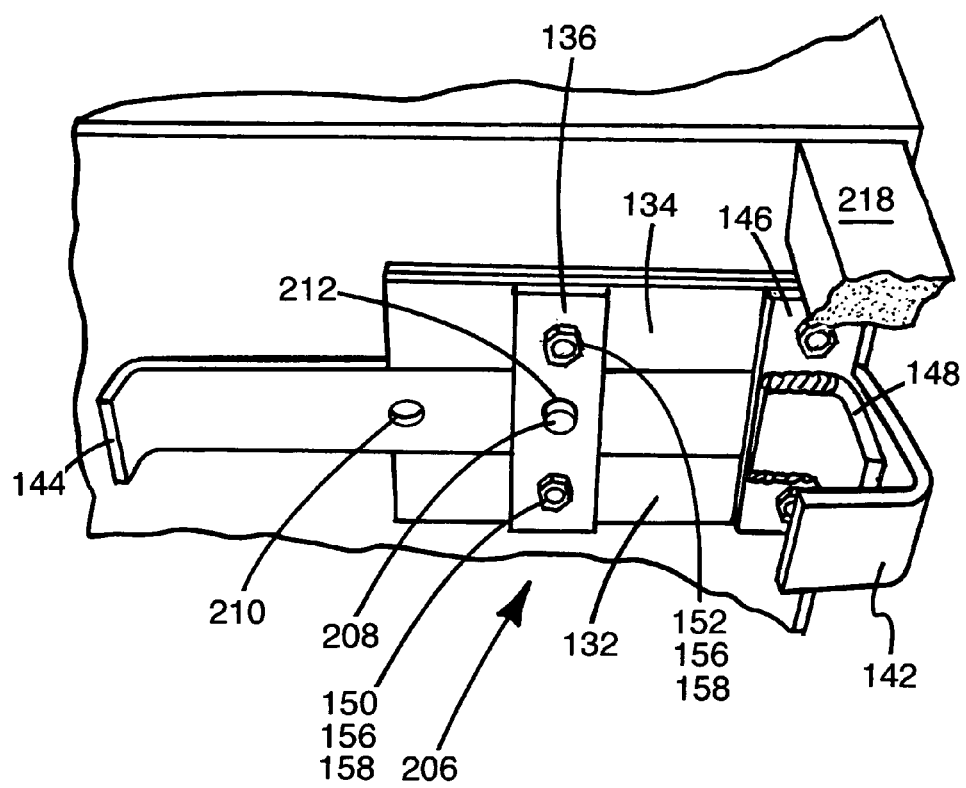
FIG. 16 depicts a bottom, perspective view of an adjustable anchor clamp 142 in closed position.

Deployed aperture 210 provides for secured railing position 190 (FIG. 12, FIG. 13, and FIG. 19). Secured railing position 190 allows adjustable anchor clamp 142 to hold utility holding device 100 in a secure position on railing 202. Closed aperture 212 provides for closed position 206 (FIG. 15 and FIG. 16) of adjustable anchor clamp 142 locking it in place for safety and convenience when utility holding device 100 is not in use. Closed aperture 212 permits concealed end 214 of spring loaded latch pin 208 to be concealed in top compartment tray 140. Thus, the adjustable anchor clamps 142 provide for use of utility holding device 100 with the scaffold 200.

Inner side rail 132 and outer side rail 134 are attached to the bottom of top compartment tray 140. Inner side rail 132 and outer side rail 134 are parallel with a space between them to accommodate adjustable anchor clamp 142. Inner side rail 132 and outer side rail 134 serve as a guide to keep adjustable anchor clamp 142 in place horizontally as it slides between its various positions.

Front clamp guide cradle 146 and rear clamp guide cradle 136 are mounted perpendicularly to inner side rail 132 and outer side rail 134. Adjustable anchor clamp 142 is slidably mounted between inner side rail 132 and outer side rail 134 and underneath front clamp guide cradle 146 and rear clamp guide cradle 136. Front clamp guide cradle 146 and rear clamp guide cradle 136 support adjustable anchor clamp 142 and prevent it from falling downward.

Outer side rail 134 has outer rail aperture 152, rear clamp guide cradle 136 has rear cradle aperture 156, and top compartment tray 140 has top aperture 160, which cooperate to receive bolt 158 to form a secure connection between outer side rail 134, rear clamp guide cradle 136, and top compartment tray 140. Front clamp guide cradle 146 has front cradle aperture 154 which cooperates with outer rail aperture 152 and top aperture 160 to receive bolt 150 to secure outer side rail 134 and front clamp guide cradle 146 to top compartment tray 140. Inner side rail 132 has inner rail aperture 150 which cooperates with rear cradle aperture 156 and top aperture 160 to receive bolt 158 to secure inner side rail 132 and rear clamp guide cradle 136 to top compartment tray 140. Inner rail aperture 150 also cooperates with front cradle aperture 154 and top aperture 160 to receive bolt 158 to secure inner sider rail 132 and front clamp guide cradle 146 to top compartment tray 140.

Clamp jaw base 148 extends from an edge of utility holding device 100 and more particularly top compartment tray 140, and locks the railing in place with adjustable anchor clamp 142 in secured railing position 190. Adjustable anchor clamp 142 is guided by inner side rail 132 and outer side rail 134 and to prevent adjustable anchor clamp 142 from being removed too far, and thus out of inner side rail 132 and outer side rail 134, clamp slide stop 144 is positioned at the end of adjustable anchor clamp 142.

By comparing FIG. 20, FIG. 21, FIG. 22, and FIG. 23, it can be seen that utility holding device 100 has a great number of advantages for both the electrician and the plumber. Tools and working materials can be transported more easily and efficiently. Those tools and working materials can also be moved relative to a metal ladder 102, a non-metallic ladder 108, or a lift or scaffold 200 as desired.

Referring specifically to FIG. 22, telescopic assemblies 230 can be clearly seen. The telescopic assemblies 230 are usually four in number and appear at each corner of utility holding device 100. Thus a connection is provided between base 120 and top compartment tray 140.

Figure 20:
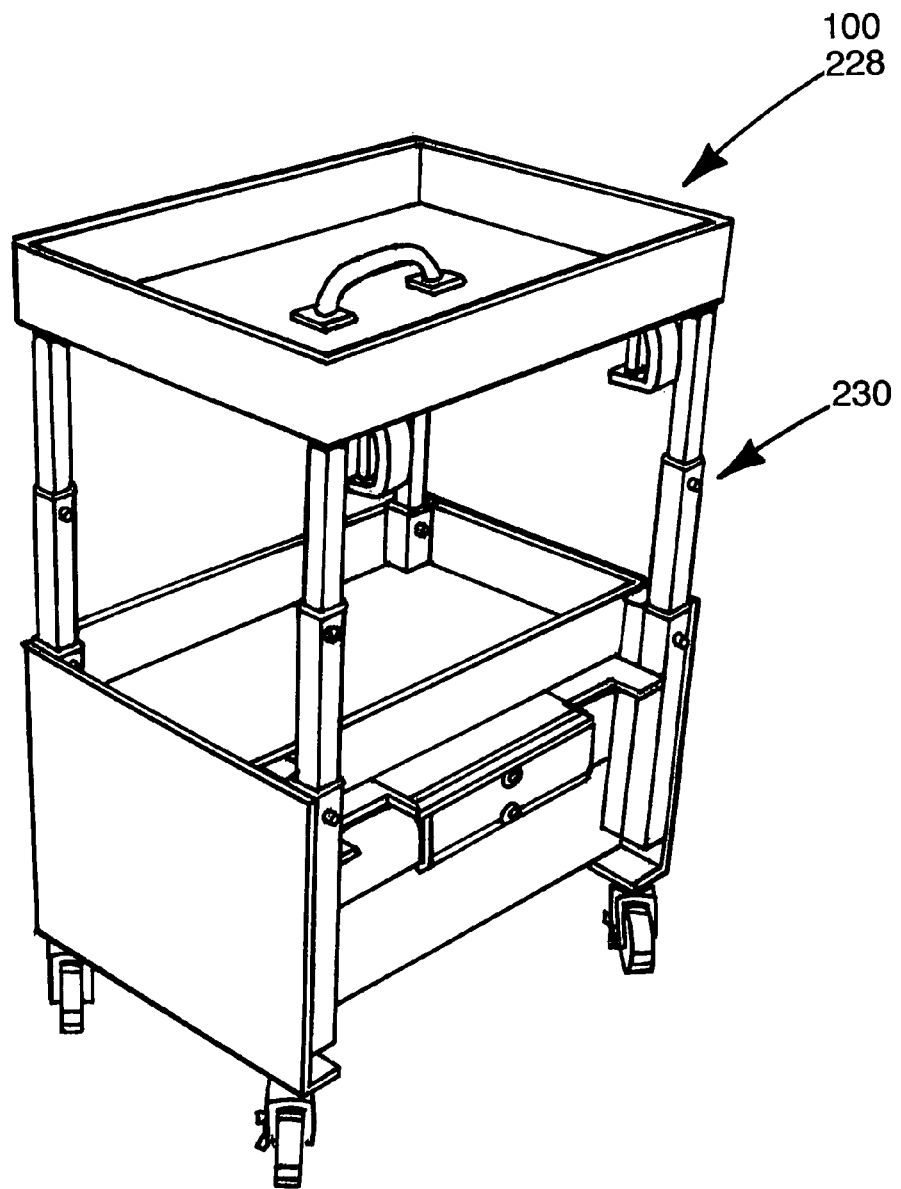
FIG. 20 depicts the utility holding device 100 of this invention with its telescopic assemblies 230 in raised position 228.
Figure 21:
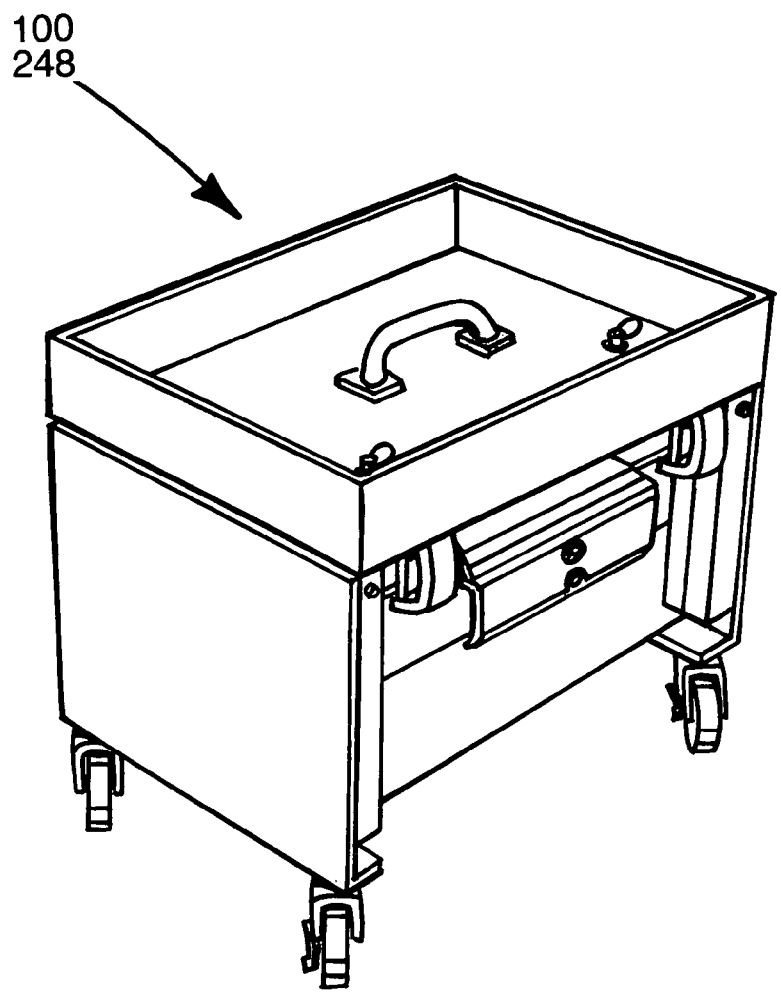
FIG. 21 depicts the utility holding device 100 of this invention with its telescopic assemblies 230 in lowered position 248.

Each telescopic assembly 230 has a base tube 232, a central tube 234, and an end tube 236. Base tube 232 joins base 120 to central tube 234. End tube 236 joins central tube 234 to top compartment tray 140. With the use of spring lock buttons 238, central tube 234 can be moved in and out of base tube 232, and end tube 236 can be moved in and out of central tube 234 and positioned relative to each other. By the same token utility holding device 100 can have top compartment tray 140 moved to a lowered position 248 (FIG. 21) relative to base 120. Also, utility holding device 100 can have top compartment tray 140 moved to raised position 228 relative to base 120 (FIG. 20).

In FIG. 23, a second embodiment of telescopic is assemblies 230, flexible length risers 244, can be clearly seen. Flexible length risers 244 are generally four in number and are positioned at each corner of utility holding device 100. Flexible length risers 244 hold top compartment tray 140 in various positions relative to base 120. Such positions include lowered position 248 (FIG. 21) and raised position 228 (FIG. 20). Such flexibility adds greatly to the functionality of the utility holding device 100.

Flexible length risers 244 move in and out of fixed tube 246. Fixed tube 246 has a locking pin aperture 242 and flexible length riser 244 has a plurality of locking pin apertures 242. Flexible length riser 244 is moved into or out of fixed tube 246 to a desired position and a locking pin aperture 242 on each is aligned and secured with locking pin 240. This allows the top compartment tray 140 to be secured to the base 120 at a variety of positions.

Turning now to FIG. 24, the flexibility of utility holding device 100 can be clearly seen. Utility holding device 100 is securely connected to a desired surface 400. The surface 400 supports the utility holding device 100 as desired. Typical of the surface 400 is a ladder, such as a metal ladder 102, a non-metallic ladder 108, any other suitable ladder or scaffold or lift 200.

For example, base 120 of the utility holding device 100 can attach to surface 400. Base 120 can attach through the connection of ladder anchor plate 122, ladder tray 104, and cross member 112 (FIG. 3, FIG. 4, FIG. 5, and FIG. 6). Base 120 may also attach through the connection of ladder anchor plate 122 and cross member 112 (FIG. 7, FIG. 8, FIG. 9, and FIG. 10). Or, base 120 may connect to railing 202 of scaffold or lift 200 through adjustable anchor clamp 142 (FIG. 11, FIG. 12, FIG. 13, FIG. 14, FIG. 15, FIG. 16, FIG. 17, FIG. 18, and FIG. 19). Also, base 120 may attach to the surface 400 through any other suitable method or device.

Base 120 is attached to top compartment tray 140 through connecting device 121. Connecting device 121 may be flexible length risers 244 with locking pin 240 (FIG. 23), telescopic assemblies 230 with spring lock button 238 (FIG. 22), fixed risers 218 (FIG. 1), or any other suitable device to provide a secure and stable connection.

Figure 25:
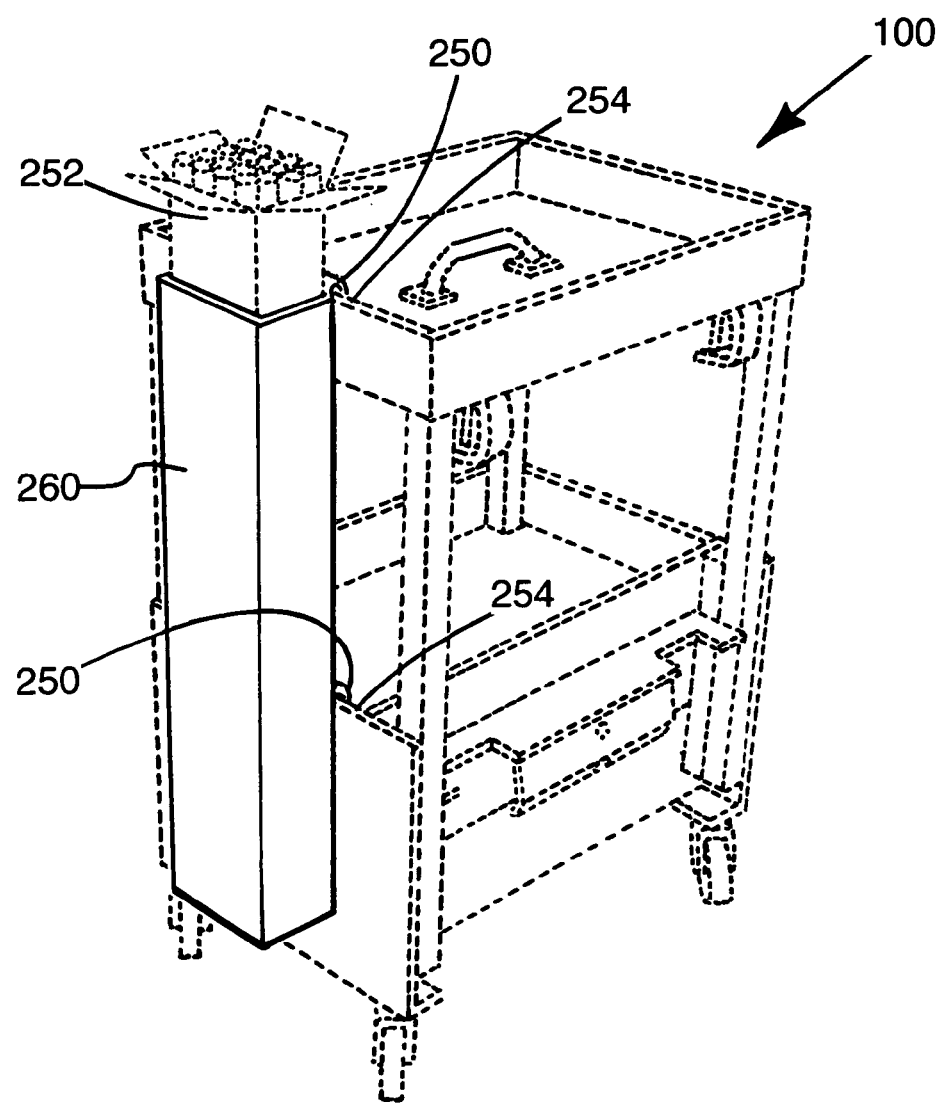
FIG. 25 depicts the utility holding device 100 of this invention with its fluorescent light box holder 260.
Figure 26:
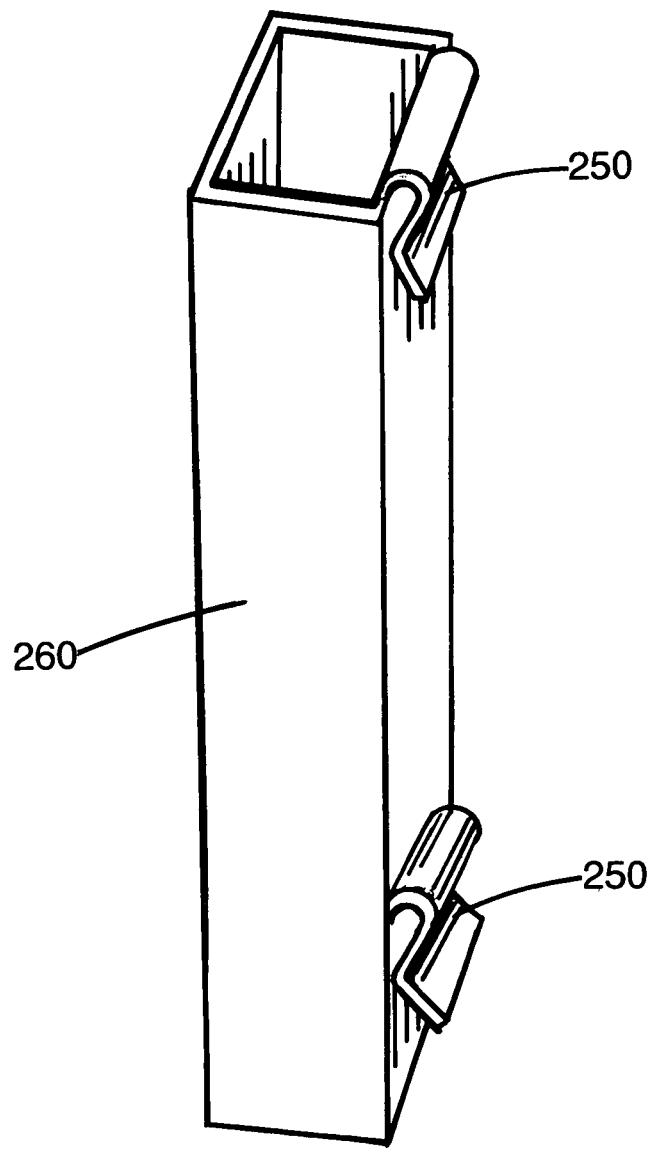
FIG. 26 depicts the fluorescent light box holder 260 for the utility holding device 100 of this invention.

Taking FIG. 25 and FIG. 26 together, a tension gripper 250 is positioned on fluorescent light box holder 260, at a top portion thereof. Tension gripper 250 fastens to the lip 254 of top compartment tray 140. While a second tension gripper 250 is positioned on a bottom portion of the fluorescent light box holder 260 in order to latch onto base lip 254 of base 120. Into fluorescent light box holder 260 may fit a boxed supply of fluorescent bulbs 252.

Lip 254 also provides a retaining or safety function for any tools or other objects that may be placed in main storage area 130 or top compartment tray 140. Lip and base lip 254 provides a high retaining edge so that objects do not fall out of main storage area 130 or top compartment tray 140.

Figure 27:
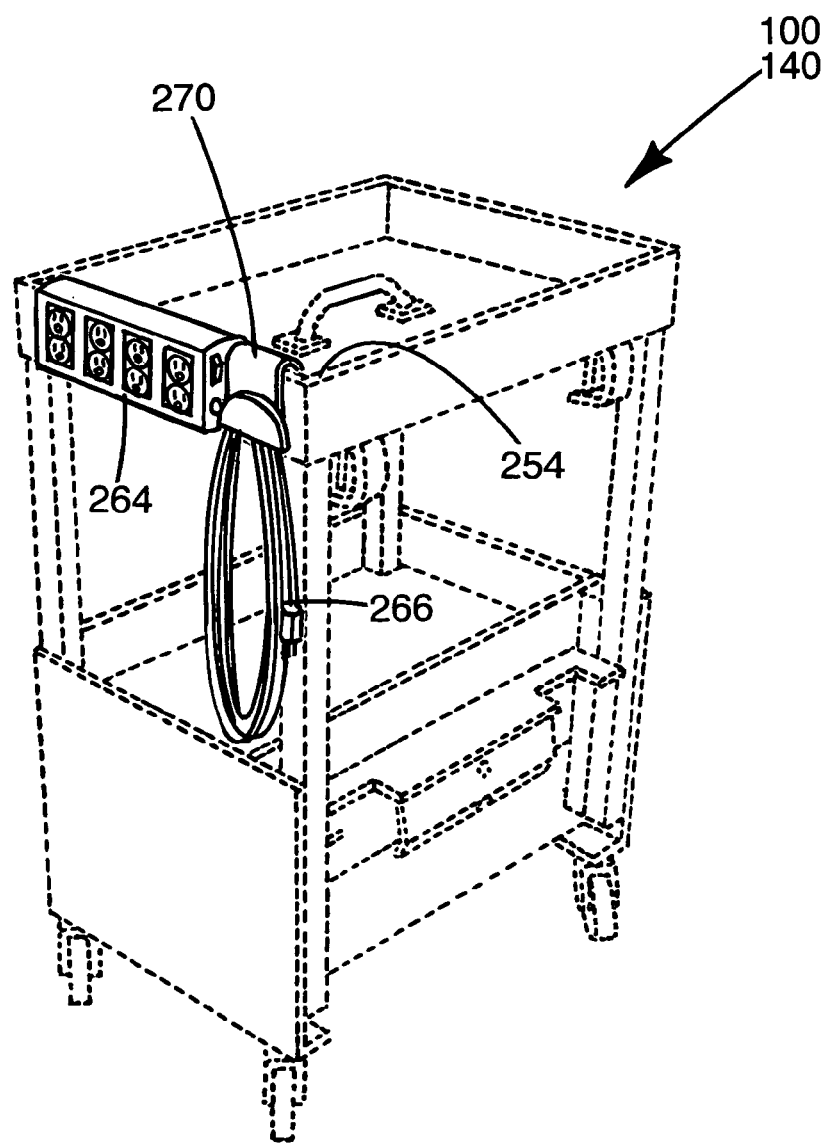
FIG. 27 depicts the utility holding device 100 of this invention with its power strip 264 and cord or hose holder 270 in place.
Figure 28:
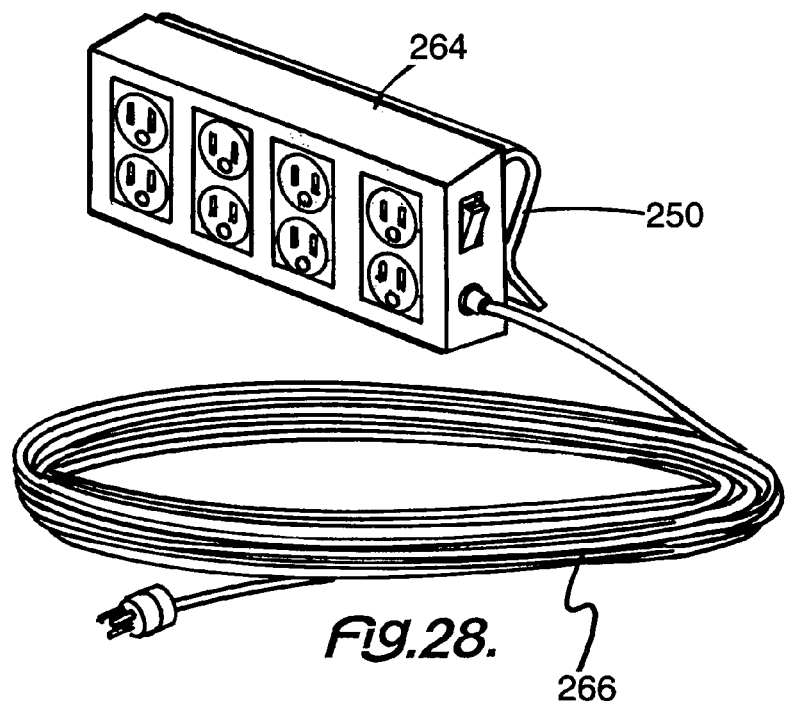
FIG. 28 depicts the power strip 264 with power cord 266 for the utility holding device 100 of this invention.
Figure 29:
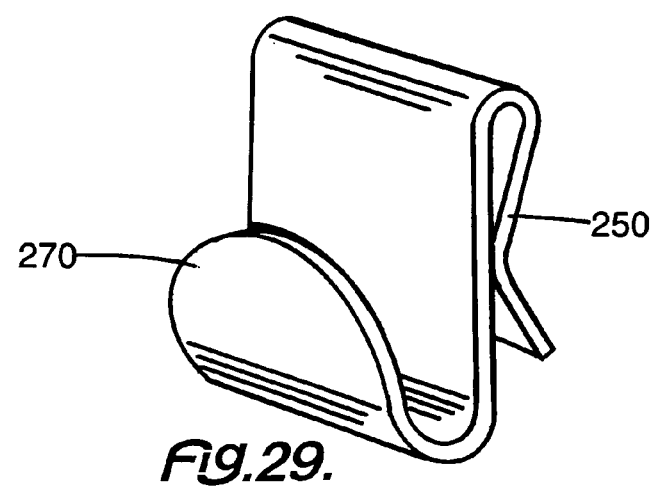
FIG. 29 depicts cord or hose holder 270 for the utility holding device 100 of this invention.

Now adding FIG. 27, FIG. 28, and FIG. 29 to the consideration, the combination shows the flexibility of electrical transportation by a utility holding device 100. To that end, a power strip 264 with the power cord 266 may be attached to the utility holding device 100. Tension gripper 250 supports the power strip 264 and cord or hose holder 270 thereon by attaching to lip 254 of top compartment tray 140. Power cord 266 is held in the cord or hose holder 270.

Also, cord or hose holder 270 is an optional but preferred embodiment. Cord or hose holder 270 has tension gripper 250 which attaches to lip 254 of top compartment tray 140. Cord or hose holder 270 provides convenient storage for power cord 266.

Figure 30:
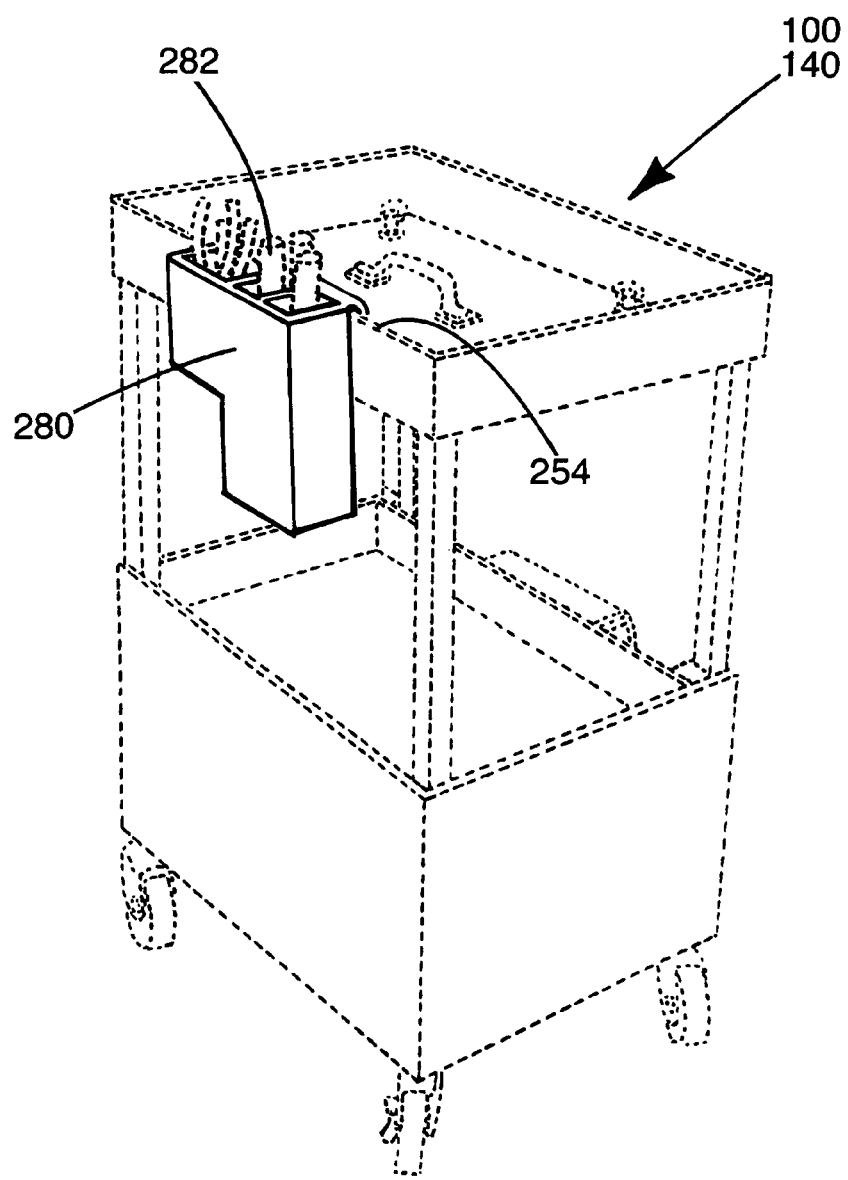
FIG. 30 depicts the utility holding device 100 of this invention with its tool holder 280 in place.
Figure 31:
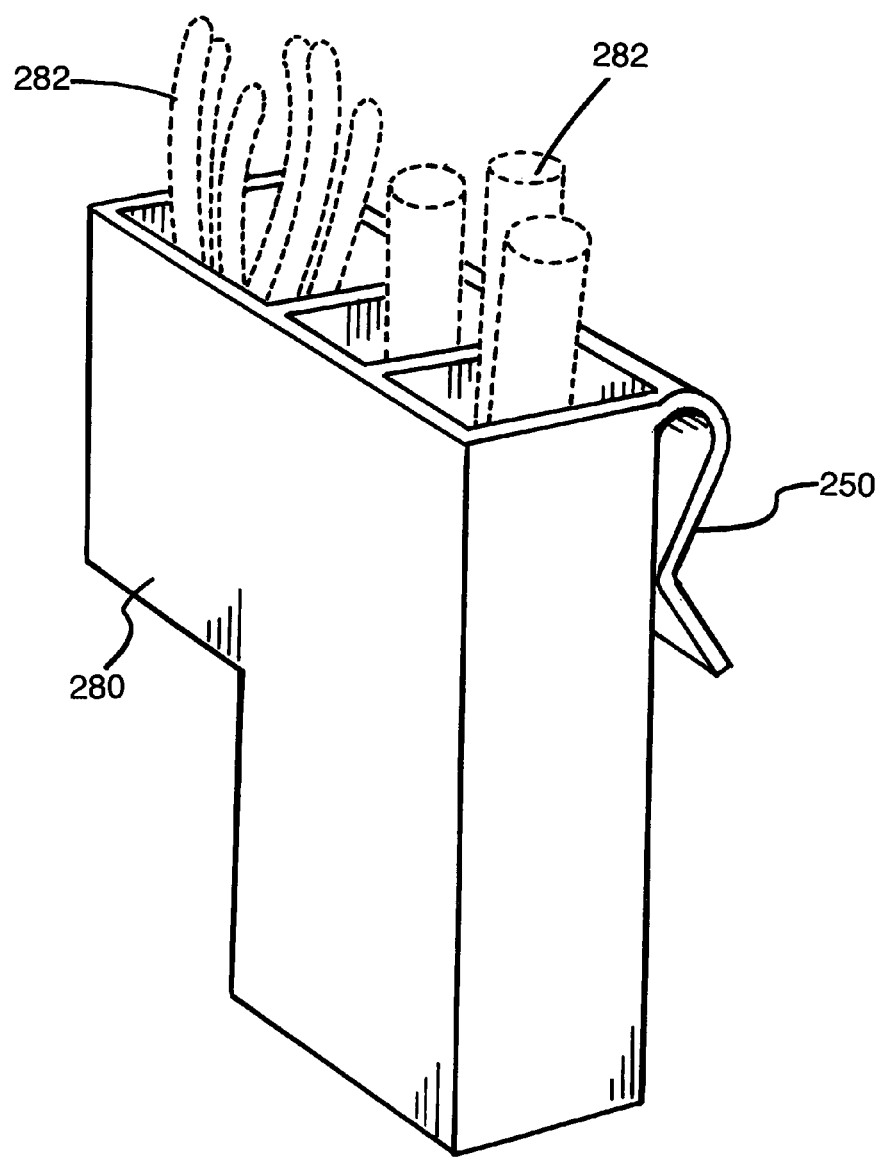
FIG. 31 depicts the tool holder 280 for the utility holding device 100 of this invention.

Now adding FIG. 30 and FIG. 31 to the consideration, the function of tool holder 280 becomes clear. Tool holder 280 contains tools 282 and attaches to lip 254 of top compartment tray 140 of utility holding device 100 with another tension gripper 250. Clearly tools 282 may be any required tools for the job at hand. Thus, utility holding device 100 allows great flexibility in providing easy access to tools 282.

Figure 32:
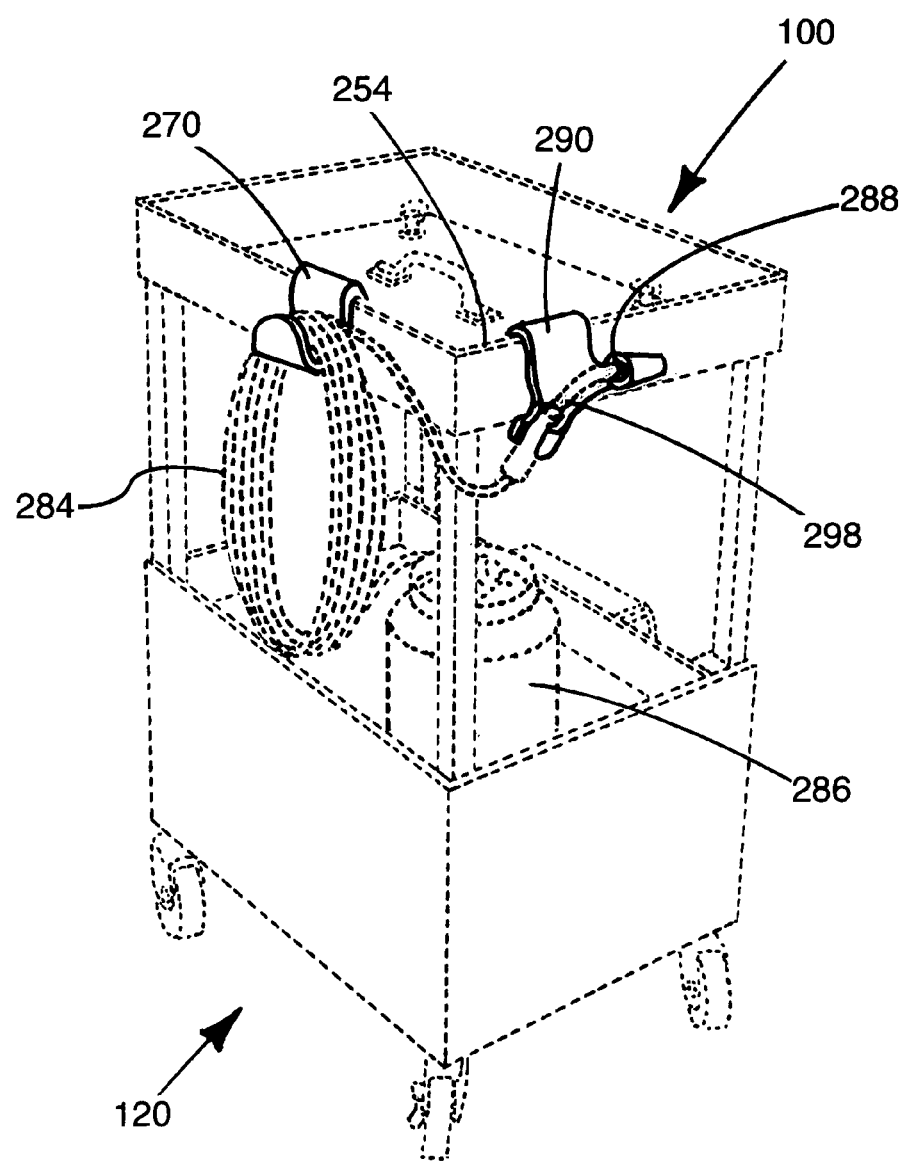
FIG. 32 depicts the utility holding device 100 of this invention with its cord or hose holder 270 and torch cradle 290 in place.
Figure 33:
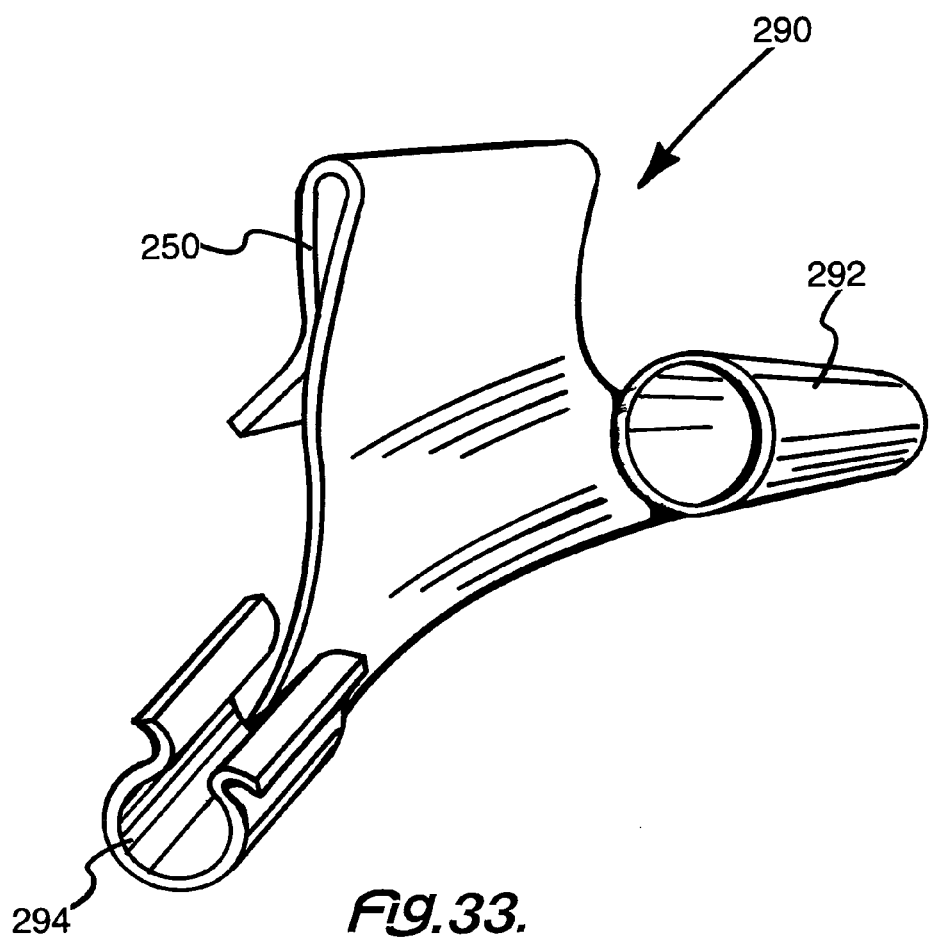
FIG. 33 depicts the torch cradle 290 for the utility holding device 100 of this invention.

Still another modification is available by considering FIG. 32 together with FIG. 33. A welding hose 284 connects welding tank 286 to welding torch 298 to welding nozzle 288. Welding tank 286 rests in base 120. Hose 284 rests in cord or hose holder 270. Nozzle 288 and torch 298 are held in position through torch cradle 290. Torch cradle 290 is held in place by tension gripper 250 which attaches to lip 254 of top compartment tray 140. More particularly, torch cradle 290 includes a nozzle rest 292 on one side of tension gripper 250 with handle holster 294 on the opposing side of tension gripper 250. Handle holster 294 accepts torch 298 and nozzle rest 292 accepts nozzle 288.

A first ladder carrying modification appears in FIG. 34, FIG. 35, FIG. 36, and FIG. 37. To that end a top-ladder holder 300 is secured to top compartment tray 140, while a bottom-ladder holder 310 is secured to base 120. Both top-ladder holder 300 and bottom-ladder holder 310 have a tension gripper 250 thereon which attaches to lip or base lip 254 of top compartment tray 140 or base 120. Oppositely disposed therefrom is a rung support 304 to receive cross member 112 of the ladder 296. Ladder 296 may be a metal ladder 102 (FIG. 3) or a non-metallic ladder 108 (FIG. 7). In this fashion, either ladder 296 is held vertically. This adds great flexibility to the utility holding device 100.

Figure 34:
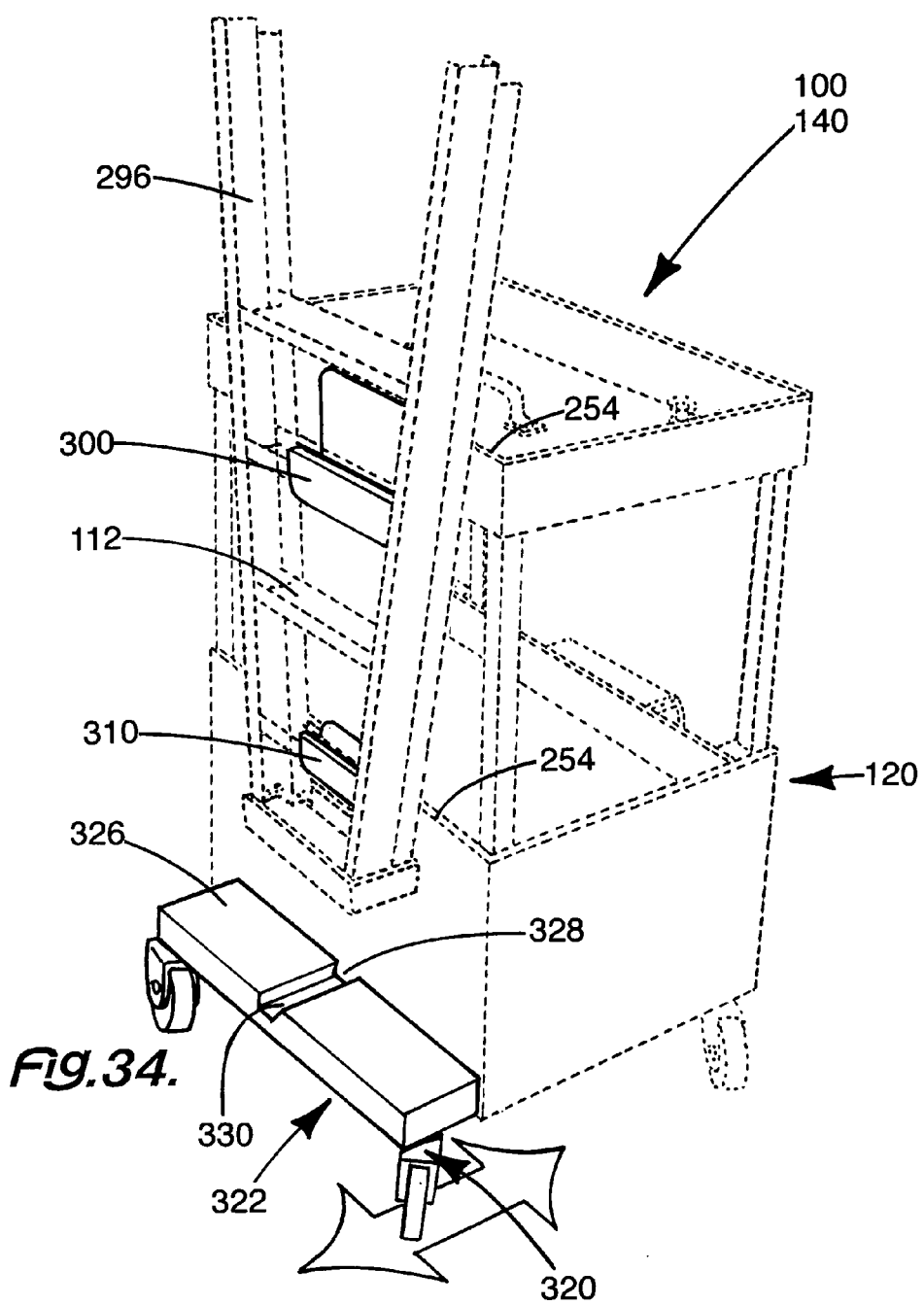
FIG. 34 depicts the utility holding device 100 of this invention with its wheel extension 320 in deployed position 322 and ladder 296 in place.
Figure 35:
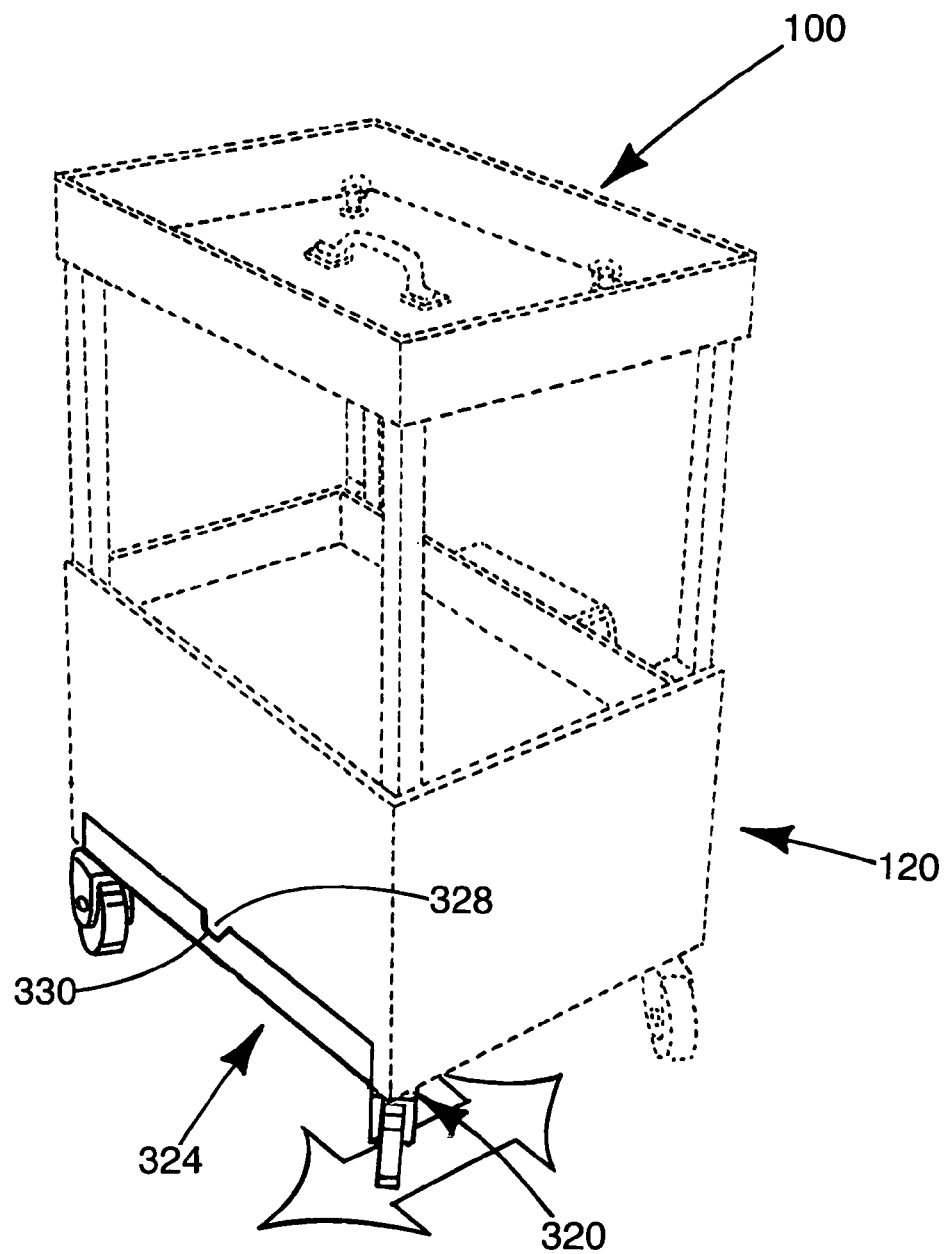
FIG. 35 depicts the utility holding device 100 of this invention with its wheel extension 320 in stored position 324.
Figure 36:
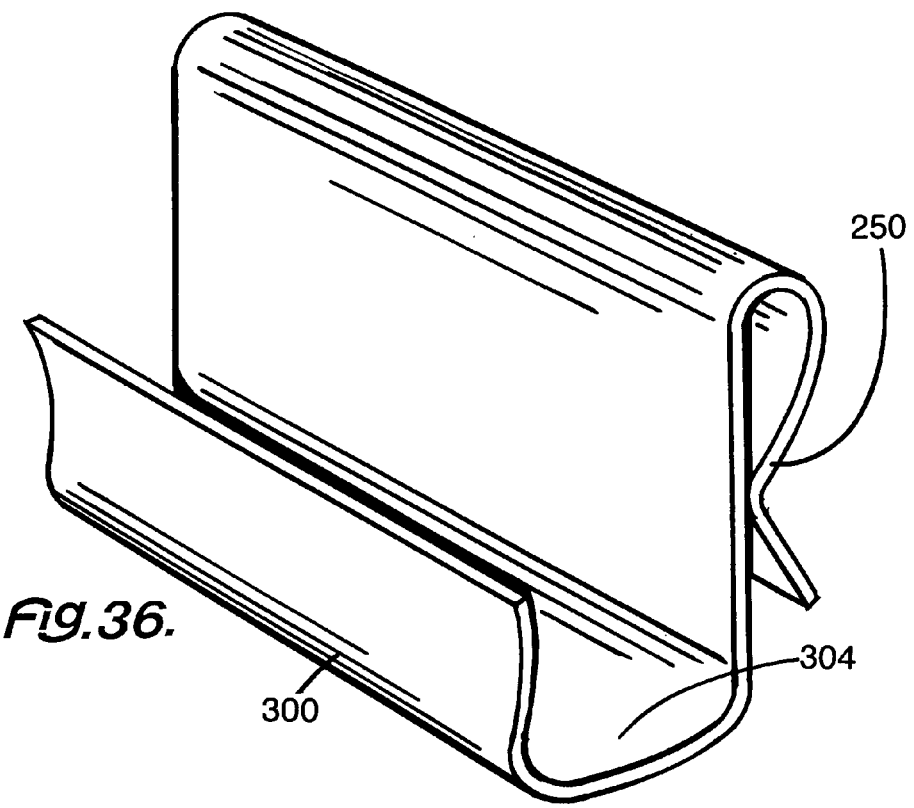
FIG. 36 depicts top-ladder holder 300 for ladder 296 of the utility holding device 100 of this invention.
Figure 37:
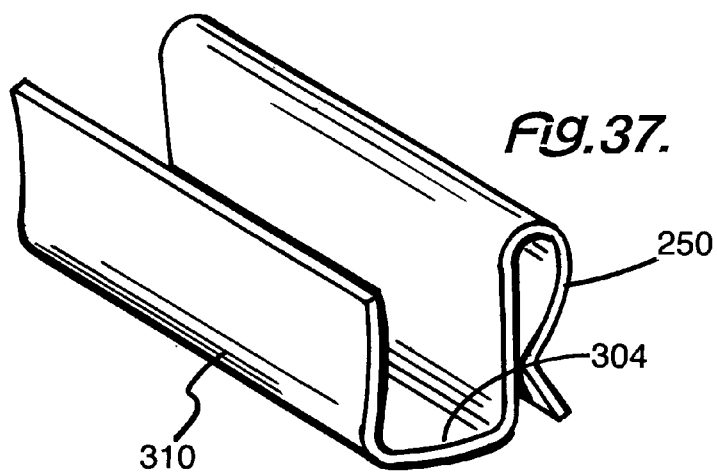
FIG. 37 depicts bottom-ladder holder 310 for ladder 296 of the utility holding device 100 of this invention.

Referring specifically to FIG. 34 and FIG. 35, the base 120 includes a wheel extension 320 in a deployed position 322 (FIG. 34) and a stored position 324 (FIG. 35). Two of lockable casters 170 are mounted on either end of a wheel housing 326. A slide bar 328 is positioned on base 120 between the lockable casters 170. The slide bar 328 fits movably into support slot 330 on wheel housing 326. Slide bar 328 maintains the wheel housing 326 more securely inside base 120 when in stored position 324. When slide bar 328 permits deployed position 322, utility holding device 100 has a wider base and becomes more stable especially when accommodating the bulk and weight of ladder 296. When slide bar 328 permits stored position 324, utility holding device 100 has a narrower base and becomes more easily transportable.

Figure 38:
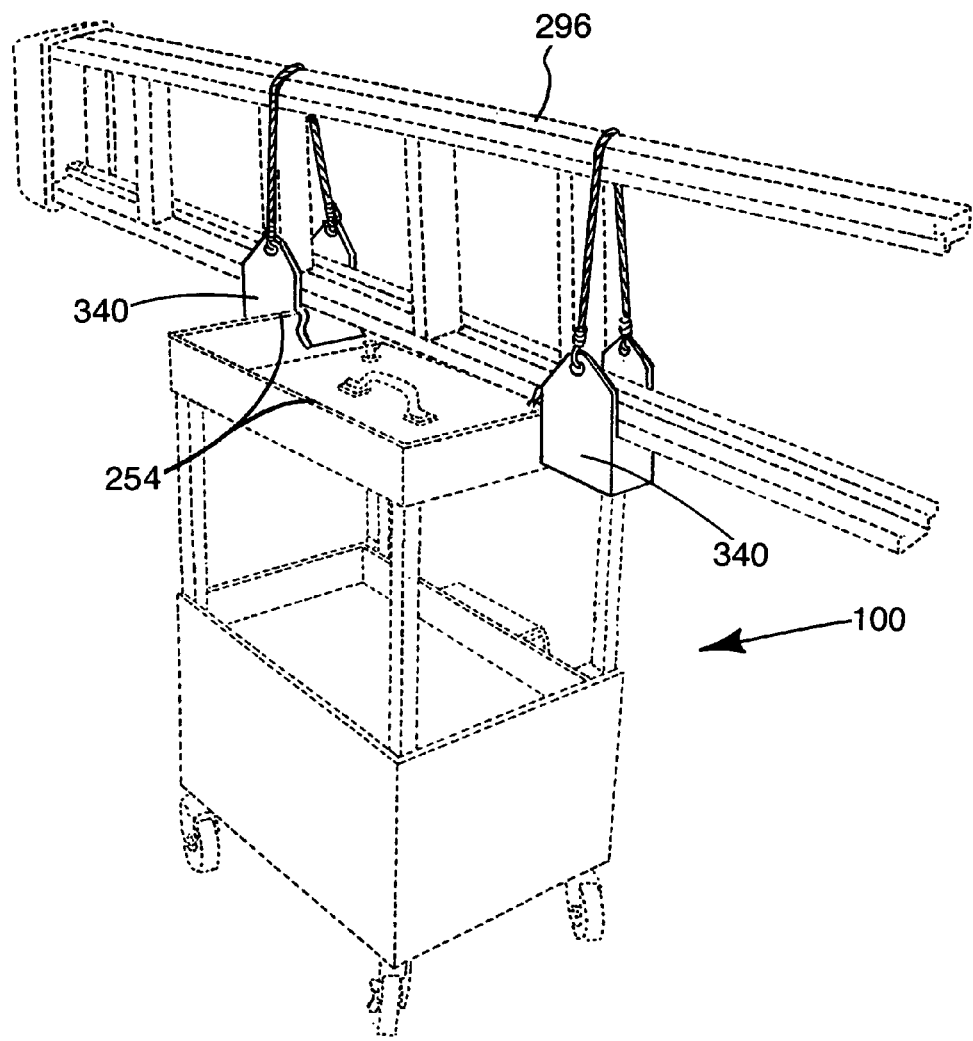
FIG. 38 depicts the utility holding device 100 of this invention with a horizontal ladder 296 in place due to two of ladder cradle 340.
Figure 39:
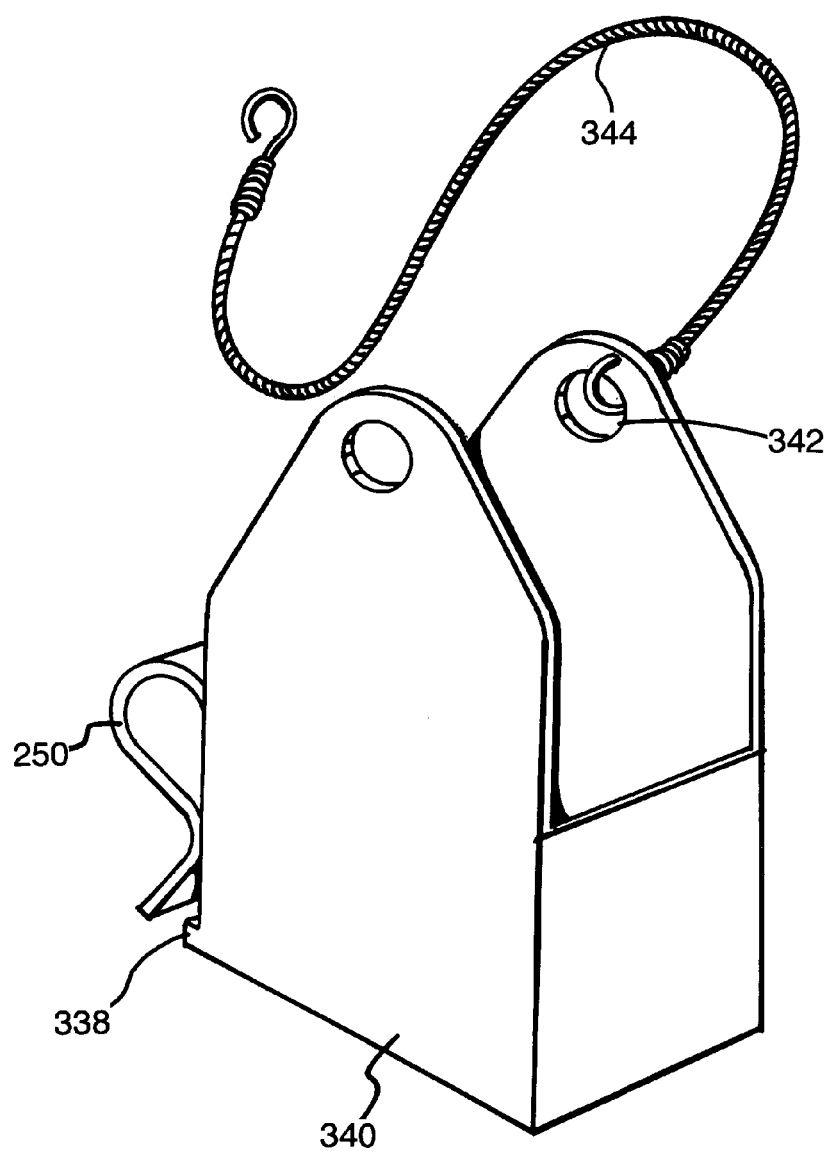
FIG. 39 depicts the ladder cradle 340 and bungee cord 344 for the utility holding device 100.
Figure 40:
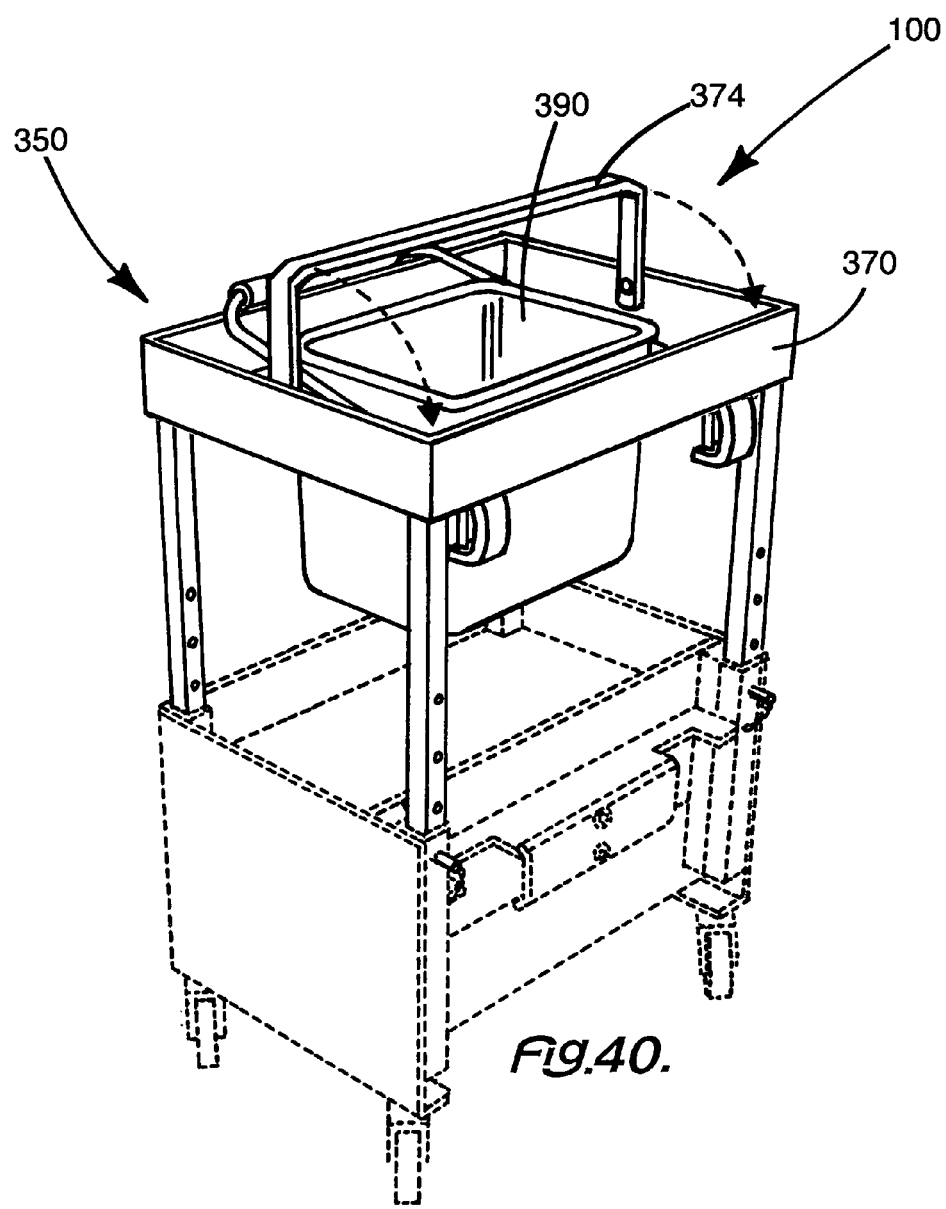
FIG. 40 depicts the utility holding device 100 of this invention with alternative bucket embodiment 350 in raised position 228.
Figure 41:
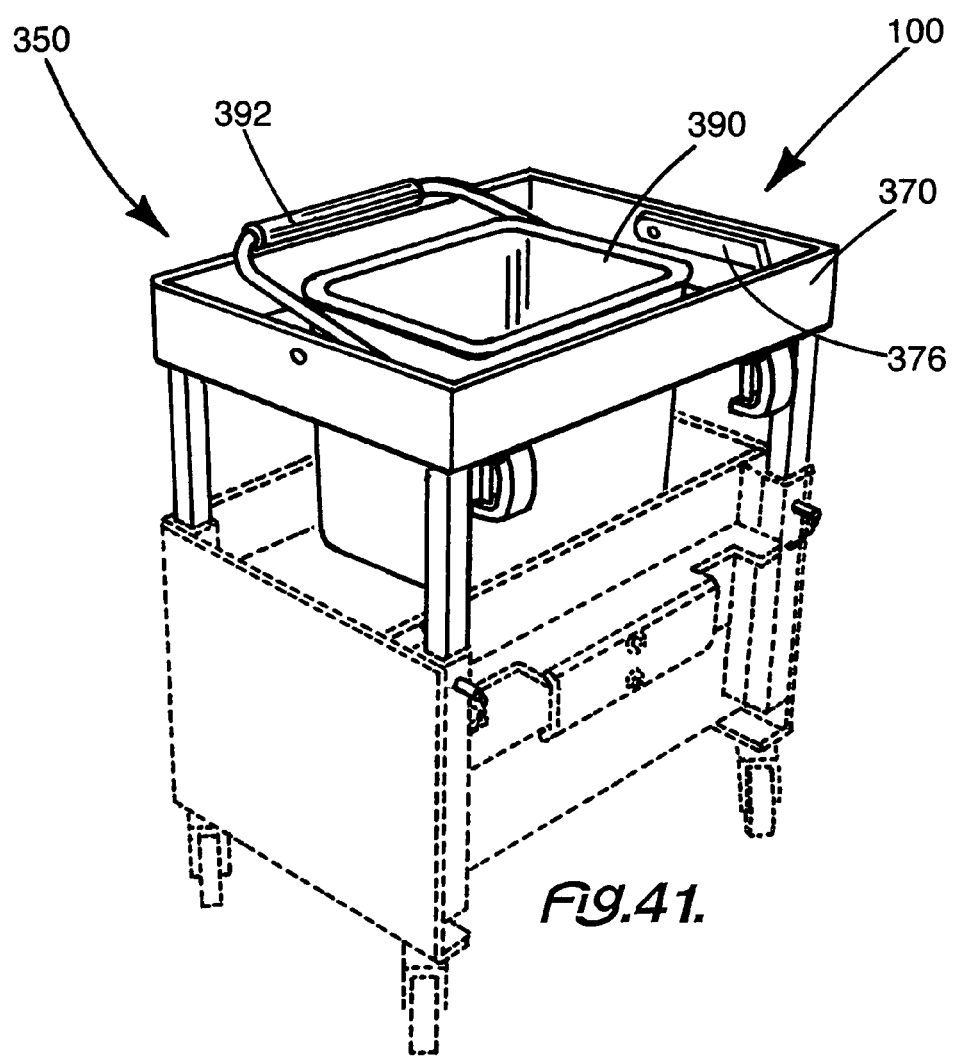
FIG. 41 depicts the utility holding device 100 of this invention with alternative bucket embodiment 350 in lowered position 248.

To hold a ladder 296 in a horizontal position such as is shown in FIG. 38 and FIG. 39, a U-shaped ladder cradle 340 is used. Again, ladder 296 may be a metal ladder 102 (FIG. 3) or a non-metallic ladder 108 (FIG. 7). In this fashion, either ladder 296 is held horizontally.

Each U-shaped ladder cradle 340 has a tension gripper 250 to attach to lip 254 on opposing sides of top compartment tray 140. On each side of the U-shaped ladder cradle 340 are cradle apertures 342. As the ladder 296 fits into the U-shaped ladder cradle 340, a bungee cord 344 is put around the ladder 296 and inserted into the each of the cradle apertures 342. Thus, the ladder 296 is secured to the utility holding device 100. A locking lip 338 is positioned adjacent to tension gripper 250 to brace the U-shaped ladder cradle 340 against the top compartment tray 140.

Now adding FIG. 40, FIG. 41, FIG. 42, and FIG. 43 to the consideration, the structure and function of bucket embodiment 350 of utility holding device 100 can be clearly seen. In this embodiment, aperture tray 370 replaces top compartment tray 140 as the top segment.

As seen in FIG. 23, top compartment tray 140 may be connected to base 120 through the cooperation of locking pin 240 and locking pin apertures 242. To remove top compartment tray 140, locking pin 240 is released from the preferably four locking pin apertures 242. Then the preferably four flexible length risers 244 are pulled out of and removed from the corresponding fixed tubes 246.

Once top compartment tray 140 is removed, aperture tray 370 can be attached. The preferably four flexible length risers 244 of aperture tray 370 are inserted into the corresponding fixed tubes 246 in a male to female relationship. The flexible length risers 244 are inserted into the fixed tubes 246 until the aperture tray 370 is at the desired height relative to base 120. Then, the preferably four locking pin apertures 242 are aligned with the locking pin aperture 242 on fixed tubes 246 and the connection is secured with locking pin 240.

Aperture tray 370 has a bucket aperture 380 to receive a bucket 390. Bucket 390 sits in bucket aperture 380 and can be inserted or removed as desired. Bucket 390 may be filled with water or another liquid for cleaning or other purposes and the bucket 390 is removed to add fresh water or empty soiled water as needed. Bucket 390 can rest in aperture tray 370 and be transported around a site with base 120.

Bucket 390 has bucket handle 392 which is useful for attaching or removing bucket 390 into or from bucket aperture 380. Handle 392 also offers great convenience when transporting bucket 390 once it has been removed from aperture tray 370. Bucket handle 392, when bucket 390 is attached to aperture tray 370, can also be used to help maneuver utility holding device 100 around the site.

Aperture tray 370 also has tray handle 372. Tray handle 372 is depicted in upward position 374 in FIG. 40 and downward position 376 in FIG. 41. Upward position 374 allows tray handle 372 to be used to maneuver utility holding device 100 especially when bucket 390 is removed from aperture tray 370. Downward position 376 allows tray handle 372 to be conveniently stored when it is not in use especially when bucket 390 with bucket handle 392 is positioned in aperture tray 370.

This removable and flexible attachment provides great benefits for the utility holding tray 100. The interchangability between top compartment tray 140 and aperture tray 370 allows the user to match a top attachment for the desired purpose. Thus, utility holding device 100 has great flexibility and versatility.

Aperture tray 370 can be attached to base 120 in the manners previously described. Aperture tray 370 can have a series of fixed risers 218 (FIG. 1 and FIG. 2). Or, aperture tray 370 can use telescopic assemblies 230 and spring lock button 238 to connect to base 120 (See FIG. 22). Also, aperture tray 370 can have flexible length risers 244 and locking pin 240 to connect to base 120 (See FIG. 23).

Aperture tray 370 has lip 254 and base 120 has base lip 254. Tension gripper 250 can still be utilized to attach various components to utility holding device 100. Florescent light box holder 260 (See FIG. 25), power strip 264 (See FIG. 27 and FIG. 28), cord or hose holder 270 (See FIG. 27 and FIG. 29), tool holder 280 (See FIG. 30 and FIG. 31), torch cradle 290 (See FIG. 32 and FIG. 33), top-ladder holder 300 (See FIG. 34 and FIG. 36), bottom ladder holder 310 (see FIG. 34 and FIG. 37), and U-shaped ladder cradle 340 (See FIG. 38 and FIG. 39) can be attached to lip 254 of aperture tray and base lip 254 of base 120 in the previously described manner.

Figure 42:
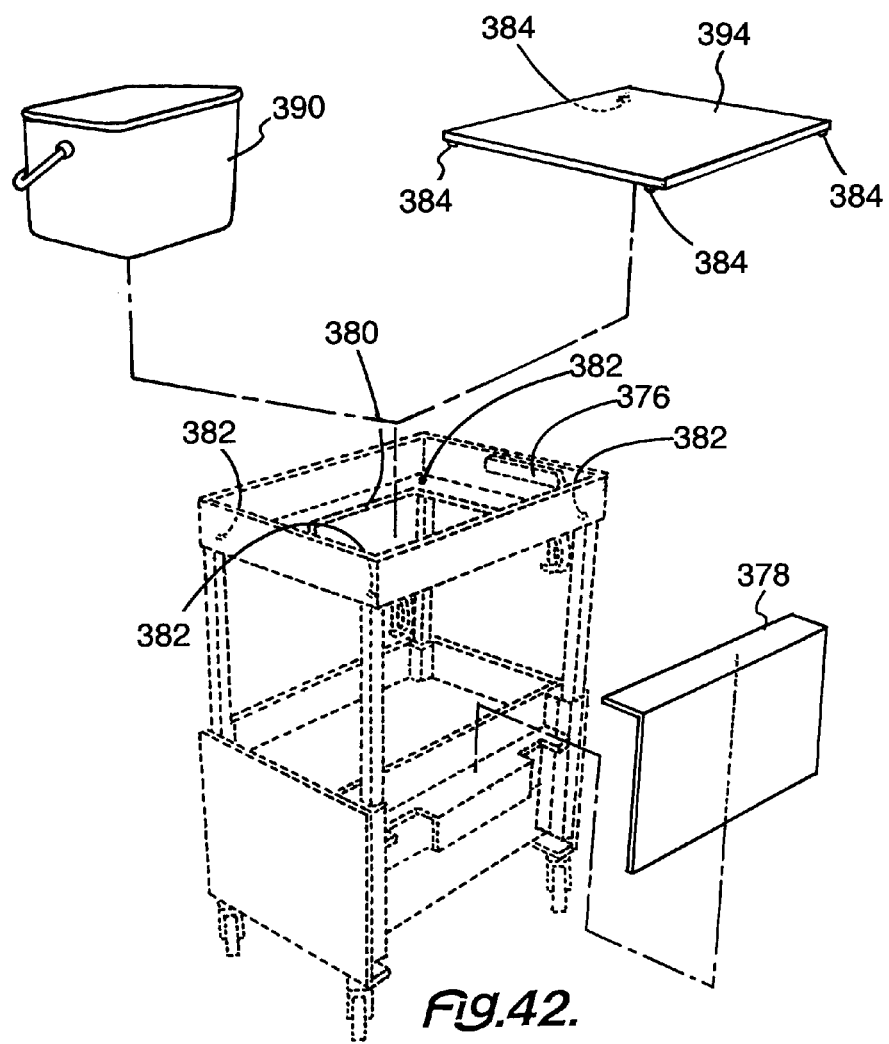
FIG. 42 depicts the utility holding device 100 of this invention with insert 394 replacing bucket 390 in bucket embodiment 350.
Figure 43:
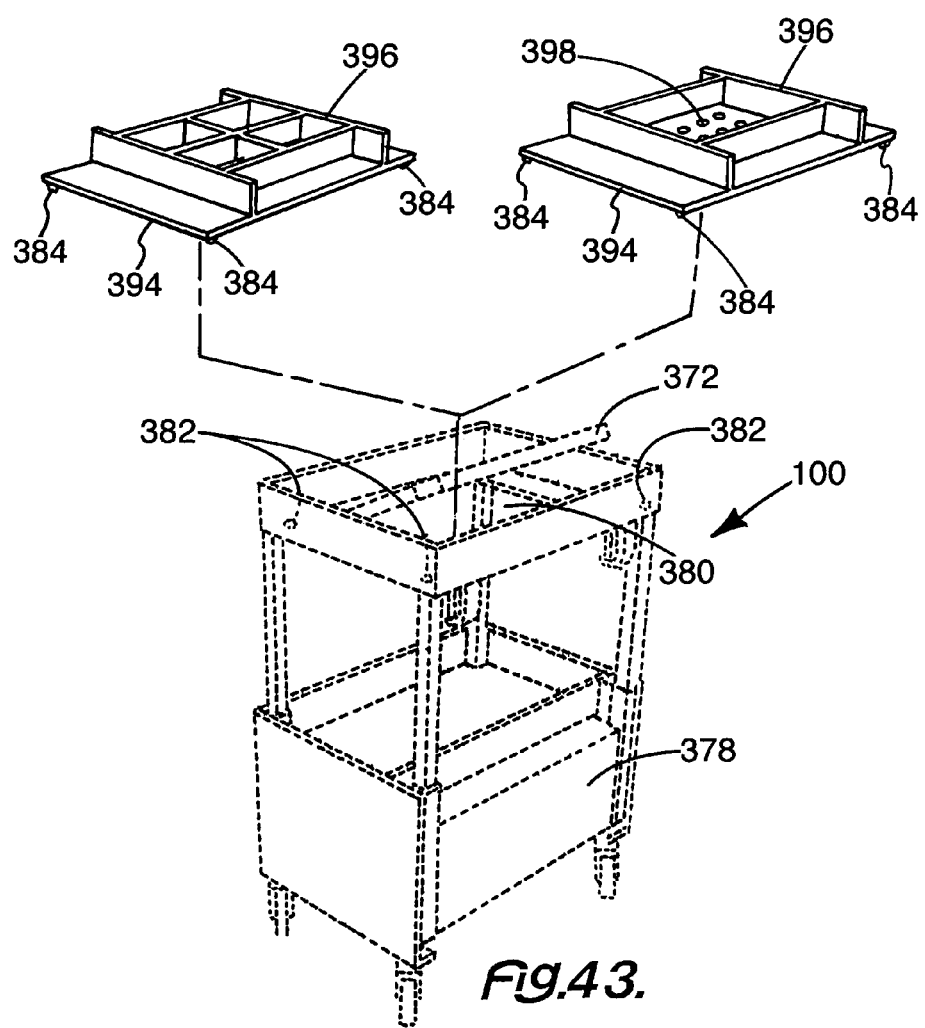
FIG. 43 depicts the utility holding device 100 with compartment insert 396 or aperture insert 398 replacing bucket 390 in bucket embodiment 350.

FIG. 42 depicts bucket embodiment 350 (FIG. 41) with the option of bucket 390 or insert 394. Bucket 390 may be removed and replaced with insert 394. Insert 394 is secured in place through the cooperation of female snap 384 and male snap 382. Insert 394 provides a flat surface to store tools 282 or other objects. In FIG. 43, insert 394 has partitions 396 and replaces bucket 390. Partitions 396 provide convenient storage for screws or other small objects. Also, insert 394 may have partitions 396 and apertures 388. Apertures 398 provide convenient storage for tools 282 such as screw drivers or pliers.

Cover 378 is a preferred option for the utility holding device 100 and can be used in any of the embodiments depicted in FIG. 1 through FIG. 43. Cover 378 attaches to ladder anchor plate 122 and is secured by friction. Cover 378 covers ladder anchor plate 122 and provides an aesthetic function.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be Protected by Letters Patent is:

1. A combination having a utility holding device and a metal ladder, the combination comprising:
   the utility holding device having a top segment connected to a base;
   the base supporting a main storage area;
   an adjustable connecting device securing the top segment to the base;
   the utility holding device being securable to the metal ladder;
   a ladder anchor plate extending from the base to receive the metal ladder;
   the ladder anchor plate cooperating with at least one cross member of the metal ladder;
   the ladder anchor plate having at least one aperture to accept an anchor bolt;
   the combination having the anchor bolt securing the ladder anchor plate to the metal ladder;

the ladder anchor plate being adapted to cooperate with the at least one cross member of the metal ladder or a ladder tray of the metal ladder to secure the utility holding device on the metal ladder;

the adjustable connecting device being at least one telescopic assembly;

the at least one aperture being at least one threaded aperture to receive the anchor bolt;

the anchor bolt securing the utility holding device to the metal ladder via the at least one cross member;

the top segment having a handle to facilitate moving the utility holding device;

the top segment having a lip extending upwardly from an outer edge of the top segment;

the base having a lip extending upwardly from an outer edge of the base;

at least one of said lips being removably fastened to a tension gripper secured to at least one from the following group consisting of a fluorescent light box holder, a power strip, a cord holder, a tool holder, a torch holder, a top ladder holder, a bottom ladder holder, and a ladder cradle;

the base having four lockable casters to aid in moving the utility holding device, two lockable casters of the four lockable casters being respectively attached to two ends of a wheel housing, the base having a slide bar positioned between said two ends of the wheel housing, the wheel housing further having a support slot, the slide bar being configured to slide within said support slot to allow the wheel housing to move between a deployed position and a stored position; and the at least one telescopic assembly being four telescopic assemblies, each of the four telescopic assemblies respectively having a base tube, an end tube, a central tube and at least one spring lock button, said base tube connecting the base to said central tube, the end tube connecting the central tube to the top segment, and each of the at least one spring lock buttons respectively being configured to lock each of the four telescopic assemblies at a plurality of different heights so that the top segment is lockable at a plurality of different heights with respect to said base 2. A combination having a utility holding device and a metal ladder, the combination comprising:

the utility holding device having a top segment connected to a base;

the base supporting a main storage area;

an adjustable connecting device securing the top segment to the base;

the utility holding device being securable to the metal ladder;

a ladder anchor plate extending from the base to receive the metal ladder;

the ladder anchor plate cooperating with at least one cross member of the metal ladder;

the ladder anchor plate having at least one aperture to accept an anchor bolt;

the combination having the anchor bolt securing the ladder anchor plate to the metal ladder;

the ladder anchor plate being adapted to cooperate with the at least one cross member of the metal ladder or a ladder tray of the metal ladder to secure the utility holding device on the metal ladder;

the adjustable connecting device being at least one flexible length riser;

the at least one aperture being at least one threaded aperture to receive the anchor bolt;

the anchor bolt securing the utility holding device to the metal ladder via the at least one cross member;

the top segment having a handle to facilitate moving the utility holding device;

the top segment having a lip extending upwardly from an outer edge of the top segment;

the base having a lip extending upwardly from an outer edge of the base;

at least one of said lips being removably fastened to a tension gripper secured to at least one from the following group consisting of a fluorescent light box holder, a power strip, a cord holder, a tool holder, a torch holder, a top ladder holder, a bottom ladder holder, and a ladder cradle;

the base having four lockable casters to aid in moving the utility holding device, two lockable casters of the four lockable casters being respectively attached to two ends of a wheel housing, the base having a slide bar positioned between said two ends of the wheel housing, the wheel housing further having a support slot, the slide bar being configured to slide within said support slot to allow the wheel housing to move between a deployed position and a stored position; and the at least one flexible length riser being four flexible length risers, each of the four flexible length risers respectively connecting with four fixed tubes and respectively configured to connect with a locking pin configured to secure the top segment at a plurality of different heights with respect to said base; each of the flexible length risers respectively having a plurality of locking pin apertures, each of the fixed tubes respectively having a locking pin hole, each one of said plurality of locking pin apertures of each respective one of said flexible length risers being configured to align with a respective said locking pin hole of each of the fixed tubes to secure the top segment at one height of said plurality of different heights.

3. A combination having a utility holding device and a non-metallic ladder, the combination comprising:

the utility holding device having a top segment connected to a base;

the base supporting a main storage area;

an adjustable connecting device securing the top segment to the base;

the utility holding device being securable to the non-metallic ladder;

the top segment having a handle to facilitate moving the utility holding device;

the top segment having a lip extending upwardly from an outer edge of the top segment;

the base having a lip extending upwardly from an outer edge of the base;

at least one of said lips being removably fastened to a tension gripper secured to at least one from the following group consisting of a fluorescent light box holder, a power strip, a cord holder, a tool holder, a torch holder, a top ladder holder, a bottom ladder holder, and a ladder cradle;

the base having four lockable casters to aid in moving the utility holding device, two lockable casters of the four lockable casters being respectively attached to two opposite ends of a wheel housing, the base having a slide bar positioned between said two opposite ends, the wheel housing further having a support slot, the slide bar being configured to slide within said support slot to allow the wheel housing to move between a deployed position and a stored position;

the utility holding device including a ladder anchor plate being secured on at least one cross member of the non-metallic ladder;

the ladder anchor plate having an upper threaded aperture to receive an anchor bolt;

the combination having the anchor bolt securing the ladder anchor plate to the non-metallic ladder via the at least one cross member; and the adjustable connecting device being four telescopic assemblies, each of the four telescopic assemblies respectively having a base tube, an end tube, a central tube and at least one spring lock button, said base tube connecting the base to said central tube, the end tube connecting the central tube to the top segment, and each of the at least one spring lock buttons respectively being configured to lock each of the four telescopic assemblies at a plurality of different heights so that the top segment is lockable at a plurality of different heights with respect to said base.

4. A combination having a utility holding device and a scaffold, the combination comprising:

the utility holding device being adapted for transporting at least one tool or material to a work area;

the utility holding device being securable to the scaffold;

the utility holding device having a top segment connected to a base;

the base supporting a main storage area;

an adjustable connecting device securing the to segment to the base;

the top segment having a handle to facilitate moving the utility holding device;

the top segment having a lip extending upwardly from an outer edge of the top segment;

the base having a lip extending upwardly from an outer edge of the base;

at least one of said lips being removably fastened to a tension gripper secured to at least one from the following group consisting of a fluorescent light box holder, a power strip, a cord holder, a tool holder, and a torch holder;

the base having four lockable casters to aid in moving the utility holding device, two lockable casters of the four lockable casters being respectively attached to two opposite ends of a wheel housing, the base having a slide bar positioned between said two opposite ends, the wheel housing further having a support slot, the slide bar being configured to slide within said support slot to allow the wheel housing to move between a deployed wheel housing position and a stored wheel housing position;

the adjustable connecting device being four telescopic assemblies, each of the four telescopic assemblies respectively having a base tube, an end tube, a central tube and at least one spring lock button, said base tube connecting the base to said central tube, the end tube connecting the central tube to the top segment, each of the at least one spring lock buttons respectively being configured to lock each of the four telescopic assemblies at a plurality of different heights so that the top segment is lockable at a plurality of different heights with respect to said base;

an adjustable anchor clamp system for securing the utility holding device to the scaffold, the adjustable anchor clamp system having an adjustable anchor clamp extending from the top segment and having the adjustable anchor clamp cooperating with at least one railing of the scaffold to securely attach the utility holding device to the scaffold, the adjustable anchor clamp system having an inner side rail and an outer side rail respectively attached to a bottom surface of the top segment, the adjustable anchor clamp being slidable between the inner side rail and the outer sider rail, the adjustable anchor clamp system having a front clamp guide cradle and a rear clamp guide cradle, each of the clamp guide cradles being perpendicularly attached to the inner side rail and the outer side rail, each of the clamp guide cradles movably securing the adjustable anchor clamp to the top segment; and the adjustable anchor clamp system having a spring loaded latch pin cooperating with the top segment, the adjustable anchor clamp, and the rear clamp guide cradle to securely hold the adjustable anchor clamp in one of a plurality of anchor clamp positions.

5. The combination of claim 4 further comprising:

a) the adjustable anchor clamp movable between a fully extended position, a closed position, and a secured railing position;

b) the adjustable anchor clamp configured to permit the at least one railing to be inserted or removed when in the fully extended position;

c) the adjustable anchor clamp configured to permit the at least one railing to securely attach to the utility holding device when in the secured railing position;

d) the adjustable anchor clamp configured to be stored when in the closed position and not in use;

e) the top segment having a female threaded aperture;

f) the rear clamp guide cradle having a cradle aperture;

g) the adjustable anchor clamp having a deployed aperture and a closed aperture;

h) the female threaded aperture, the cradle aperture, and the deployed aperture configured to align to accept the spring loaded latch pin to secure the adjustable anchor clamp in the secured railing position;

i) the female threaded aperture, the cradle aperture, and the closed aperture configured to align to accept the spring loaded latch pin to secure the adjustable anchor clamp in the closed position;

j) the adjustable anchor clamp having a clamp slide stop configured to limit movement of the adjustable anchor clamp; and k) a clamp jaw base extending from the front clamp guide cradle for cooperating with the adjustable anchor clamp to aid in holding the utility holding device on the scaffold.

* * * * *